US012572865B2

(12) United States Patent
Yanchenko et al.

(10) Patent No.: US 12,572,865 B2
(45) Date of Patent: Mar. 10, 2026

(54) AUTOMATIC AND DYNAMIC ADAPTATION OF HIERARCHICAL RECONCILIATION FOR TIME SERIES FORECASTING

(71) Applicant: International Business Machines Corporation, Armonk, NY (US)

(72) Inventors: Anna Yanchenko, Groton, MA (US); Wesley M. Gifford, Ridgefield, CT (US); Brian Leo Quanz, Yorktown Heights, NY (US); Nam H. Nguyen, Pleasantville, NY (US); Pavithra Harsha, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 18/089,030

(22) Filed: Dec. 27, 2022

(65) Prior Publication Data

US 2024/0211835 A1    Jun. 27, 2024

(51) Int. Cl.
*G06Q 10/0631* (2023.01)
(52) U.S. Cl.
CPC .............................. *G06Q 10/06313* (2013.01)
(58) Field of Classification Search
CPC ................................................ G06Q 10/06313
See application file for complete search history.

(56) References Cited

U.S. PATENT DOCUMENTS 7,822,240 B2    10/2010    Ayache et al.
7,945,570 B2     5/2011    Papadimitriou et al.
(Continued)

FOREIGN PATENT DOCUMENTS

CN    104766175 A    7/2015
JP    H07234860 A    9/1995
(Continued)

OTHER PUBLICATIONS

Ross Hollyman et al., "Understanding forecast reconciliation," 2021, European Journal of Operational Research, vol. 294, pp. 149-160 (Year: 2021).*
(Continued)

*Primary Examiner* — Amanda Gurski
(74) *Attorney, Agent, or Firm* — Harrity & Harrity, LLP

(57) ABSTRACT

Mechanisms are provided for performing automated and dynamic reconciliation of forecasts for hierarchical datasets. A machine learning training is executed on a dynamic reconciliation computer model engine to train the dynamic reconciliation computer model engine, based on historical data and forecast data, to learn an association of reconciliation computer models with structural changes in a hierarchical dataset. Runtime forecast data is generated based on a runtime hierarchical dataset, and the trained dynamic reconciliation computer model engine is executed on the runtime forecast data to reconcile the runtime forecast data across a hierarchy of the runtime forecast data. The trained dynamic reconciliation computer model applies different reconciliation computer models to the runtime forecast data based on structural changes in the runtime forecast data. Reconciled runtime forecast data is generated based on results of executing the trained dynamic reconciliation computer model engine on the runtime forecast data, which is then output.

20 Claims, 14 Drawing Sheets

(56) References Cited

U.S. PATENT DOCUMENTS

| | | | |
|---|---|---|---|
| 8,326,677 | B1 | 12/2012 | Fan et al. |
| 9,122,996 | B2 | 9/2015 | Lien et al. |
| 9,147,218 | B2 | 9/2015 | Leonard et al. |
| 9,244,887 | B2 | 1/2016 | Leonard et al. |
| 2014/0257778 | A1* | 9/2014 | Leonard ................. G06Q 40/08 |
| | | | 703/6 |
| 2015/0154664 | A1 | 6/2015 | Dawson et al. |
| 2019/0026459 | A1 | 1/2019 | Harutyunyan et al. |
| 2020/0082284 | A1 | 3/2020 | Moghtaderi et al. |
| 2021/0264375 | A1 | 8/2021 | Himura et al. |
| 2021/0350382 | A1 | 11/2021 | Lopes et al. |
| 2022/0156555 | A1* | 5/2022 | Burba ..................... G06N 3/049 |
| 2022/0383145 | A1* | 12/2022 | Sen ......................... G06N 3/045 |
| 2022/0405775 | A1* | 12/2022 | Siebel ................. G06Q 30/0202 |
| 2024/0211801 | A1 | 6/2024 | Yanchenko et al. |

FOREIGN PATENT DOCUMENTS

| | | | | |
|---|---|---|---|---|
| JP | 2004355200 | A | 12/2004 | |
| JP | 2018081462 | A | 5/2018 | |
| WO | WO-2023177308 | A1 * | 9/2023 | ............. G06Q 40/12 |

OTHER PUBLICATIONS

List of IBM Patents or Patent Applications Treated as Related, Jan. 5, 2023, 2 pages.

Abolghasemi, Mahdi et al., "Model selection in reconciling hierarchical time series", Machine Learning (2022) 111:739-789, Jan. 14, 2022, 51 pages.

Hollyman, Ross et al., "Understanding forecast reconciliation", European Journal of Operational Research 294 (2021) 149-160, Jan. 14, 2021, 12 pages.

Hyndman, R.J. et al., "Forecasting hierarchical or grouped time series, Chapter 10", Forecasting: Principles and Practice (2018), May 8, 2018, 35 pages.

Spiliotis, Evangelos et al., "Improving the forecasting performance of temporal hierarchies", PLOS One, No. 10, (2019), Oct. 3, 2019, 21 pages.

Taieb, Souhaib B. et al., "Regularized Regression for Hierarchical Forecasting Without Unbiasedness Conditions", Proceedings of the 25th ACM SIGKDD International Conference on Knowledge Discovery & Data Mining (KDD '19), Aug. 4-8, 2019, pp. 1337-1347, 11 pages.

Wickramasuriya, Shanika L. et al., "Optimal Forecast Reconciliation for Hierarchical and Grouped Time Series Through Trace Minimization", Journal of the American Statistical Association 114, No. 526 (2019): 804-819, 2019, submitted version of reference dated Jun. 15, 2017, 42 pages.

Yanchenko, Anna et al., Pending U.S. Appl. No. 18/089,078, filed Dec. 27, 2022, titled "Identification of Hierarchical Reconciliation Processes for Producing Coherent Forecasts", 56 pages.

Koehrsen et al. "Automated Machine Learning Hyperparameter Tuning in Python," retrieved from web, https://medium.com/data-science/automated-machine-learning-hyperparameter-tuning-in-python-dfda59b72f8a, Jul. 3, 2018, 23 pages.

Wu et al., "Hyperparameter Optimization for Machine Learning Models Based on Bayesian Optimization," Journal of Electronic Science and Technology, Mar. 2019, pp. 26-40, vol. 17, Issue 1, https://doi.org/10.11989/JEST.1674-862X.80904120, https://www.sciencedirect.com/science/article/pii/S1674862X19300047.

* cited by examiner

BOTTOM-UP $$230 \quad \begin{bmatrix} \tilde{Y}_T \\ \tilde{Y}_A \\ \tilde{Y}_B \\ \tilde{Y}_{AA} \\ \tilde{Y}_{AB} \\ \tilde{Y}_{AC} \\ \tilde{Y}_{BA} \\ \tilde{Y}_{BB} \end{bmatrix} = S \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \begin{bmatrix} \hat{Y}_T \\ \hat{Y}_A \\ \hat{Y}_B \\ \hat{Y}_{AA} \\ \hat{Y}_{AB} \\ \hat{Y}_{AC} \\ \hat{Y}_{BA} \\ \hat{Y}_{BB} \end{bmatrix}$$

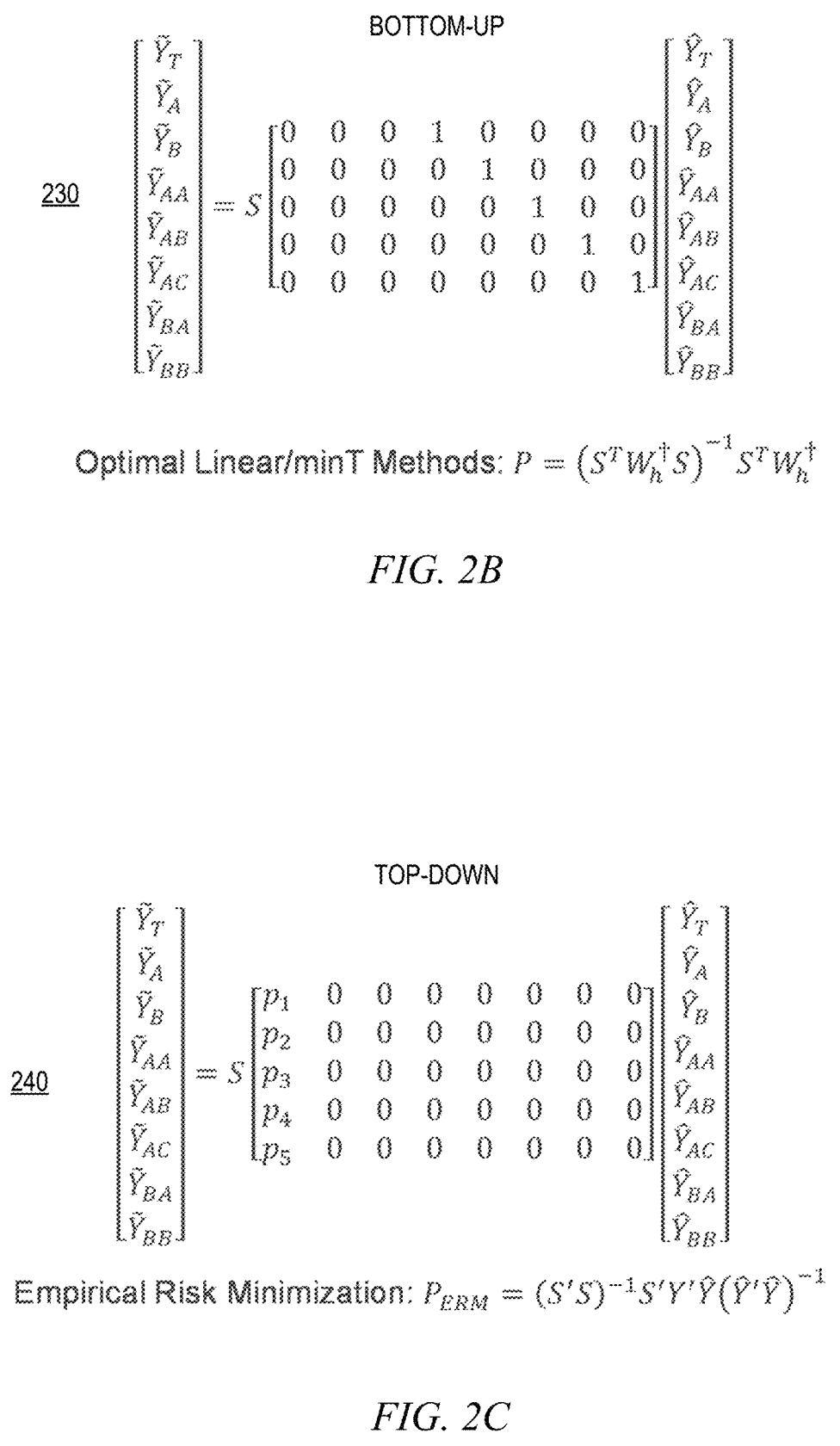

Optimal Linear/minT Methods: $P = \left(S^T W_h^\dagger S\right)^{-1} S^T W_h^\dagger$

FIG. 2B

TOP-DOWN $$240 \quad \begin{bmatrix} \tilde{Y}_T \\ \tilde{Y}_A \\ \tilde{Y}_B \\ \tilde{Y}_{AA} \\ \tilde{Y}_{AB} \\ \tilde{Y}_{AC} \\ \tilde{Y}_{BA} \\ \tilde{Y}_{BB} \end{bmatrix} = S \begin{bmatrix} p_1 & 0 & 0 & 0 & 0 & 0 & 0 & 0 \\ p_2 & 0 & 0 & 0 & 0 & 0 & 0 & 0 \\ p_3 & 0 & 0 & 0 & 0 & 0 & 0 & 0 \\ p_4 & 0 & 0 & 0 & 0 & 0 & 0 & 0 \\ p_5 & 0 & 0 & 0 & 0 & 0 & 0 & 0 \end{bmatrix} \begin{bmatrix} \hat{Y}_T \\ \hat{Y}_A \\ \hat{Y}_B \\ \hat{Y}_{AA} \\ \hat{Y}_{AB} \\ \hat{Y}_{AC} \\ \hat{Y}_{BA} \\ \hat{Y}_{BB} \end{bmatrix}$$

Empirical Risk Minimization: $P_{ERM} = (S'S)^{-1} S' Y' \hat{Y} \left(\hat{Y}' \hat{Y}\right)^{-1}$

FIG. 2C

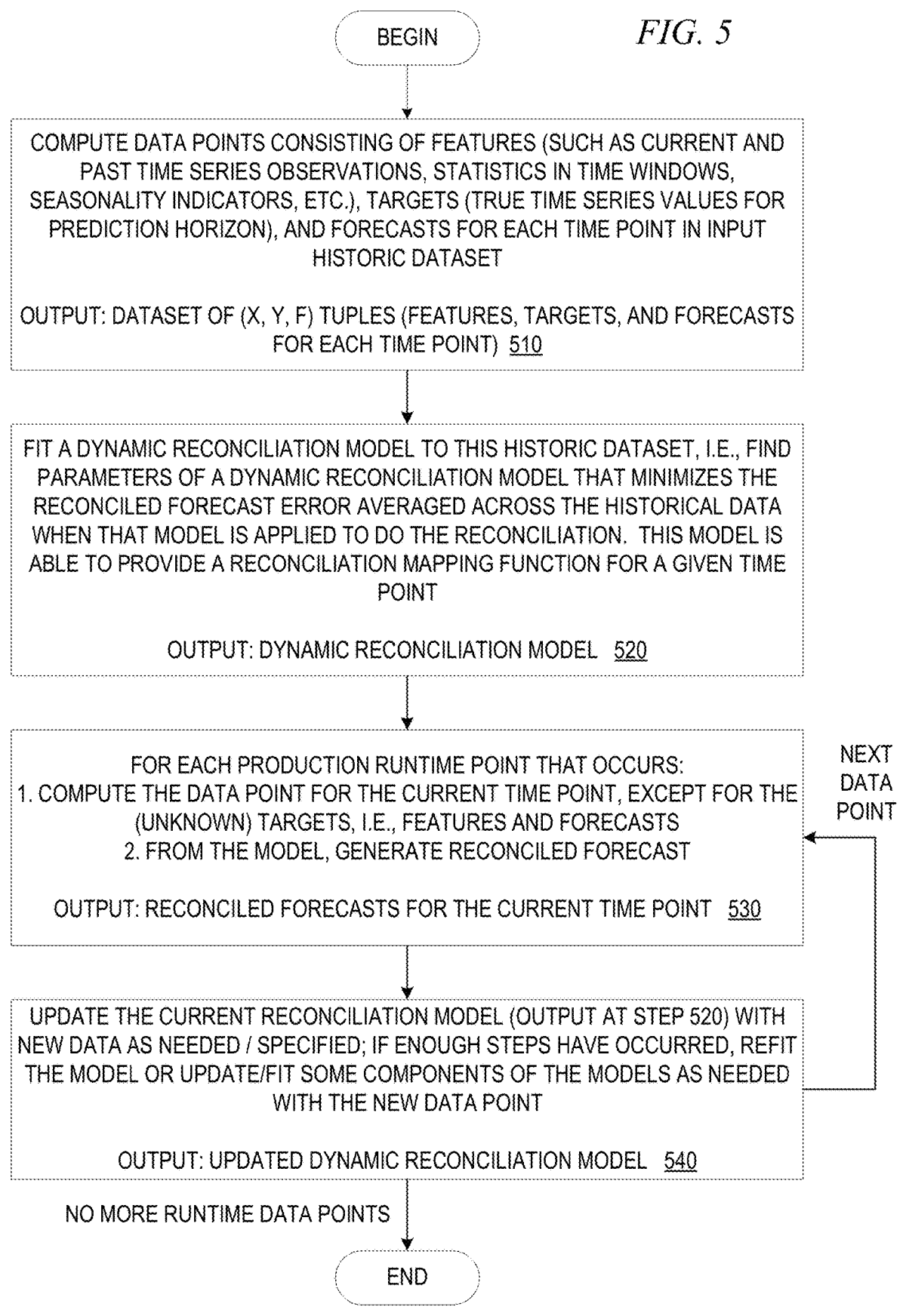

BEGIN

*FIG. 5*

COMPUTE DATA POINTS CONSISTING OF FEATURES (SUCH AS CURRENT AND PAST TIME SERIES OBSERVATIONS, STATISTICS IN TIME WINDOWS, SEASONALITY INDICATORS, ETC.), TARGETS (TRUE TIME SERIES VALUES FOR PREDICTION HORIZON), AND FORECASTS FOR EACH TIME POINT IN INPUT HISTORIC DATASET

OUTPUT: DATASET OF (X, Y, F) TUPLES (FEATURES, TARGETS, AND FORECASTS FOR EACH TIME POINT) 510

FIT A DYNAMIC RECONCILIATION MODEL TO THIS HISTORIC DATASET, I.E., FIND PARAMETERS OF A DYNAMIC RECONCILIATION MODEL THAT MINIMIZES THE RECONCILED FORECAST ERROR AVERAGED ACROSS THE HISTORICAL DATA WHEN THAT MODEL IS APPLIED TO DO THE RECONCILIATION. THIS MODEL IS ABLE TO PROVIDE A RECONCILIATION MAPPING FUNCTION FOR A GIVEN TIME POINT

OUTPUT: DYNAMIC RECONCILIATION MODEL 520

FOR EACH PRODUCTION RUNTIME POINT THAT OCCURS:
1. COMPUTE THE DATA POINT FOR THE CURRENT TIME POINT, EXCEPT FOR THE (UNKNOWN) TARGETS, I.E., FEATURES AND FORECASTS
2. FROM THE MODEL, GENERATE RECONCILED FORECAST

OUTPUT: RECONCILED FORECASTS FOR THE CURRENT TIME POINT 530

NEXT DATA POINT

UPDATE THE CURRENT RECONCILIATION MODEL (OUTPUT AT STEP 520) WITH NEW DATA AS NEEDED / SPECIFIED; IF ENOUGH STEPS HAVE OCCURRED, REFIT THE MODEL OR UPDATE/FIT SOME COMPONENTS OF THE MODELS AS NEEDED WITH THE NEW DATA POINT

OUTPUT: UPDATED DYNAMIC RECONCILIATION MODEL 540

NO MORE RUNTIME DATA POINTS

END

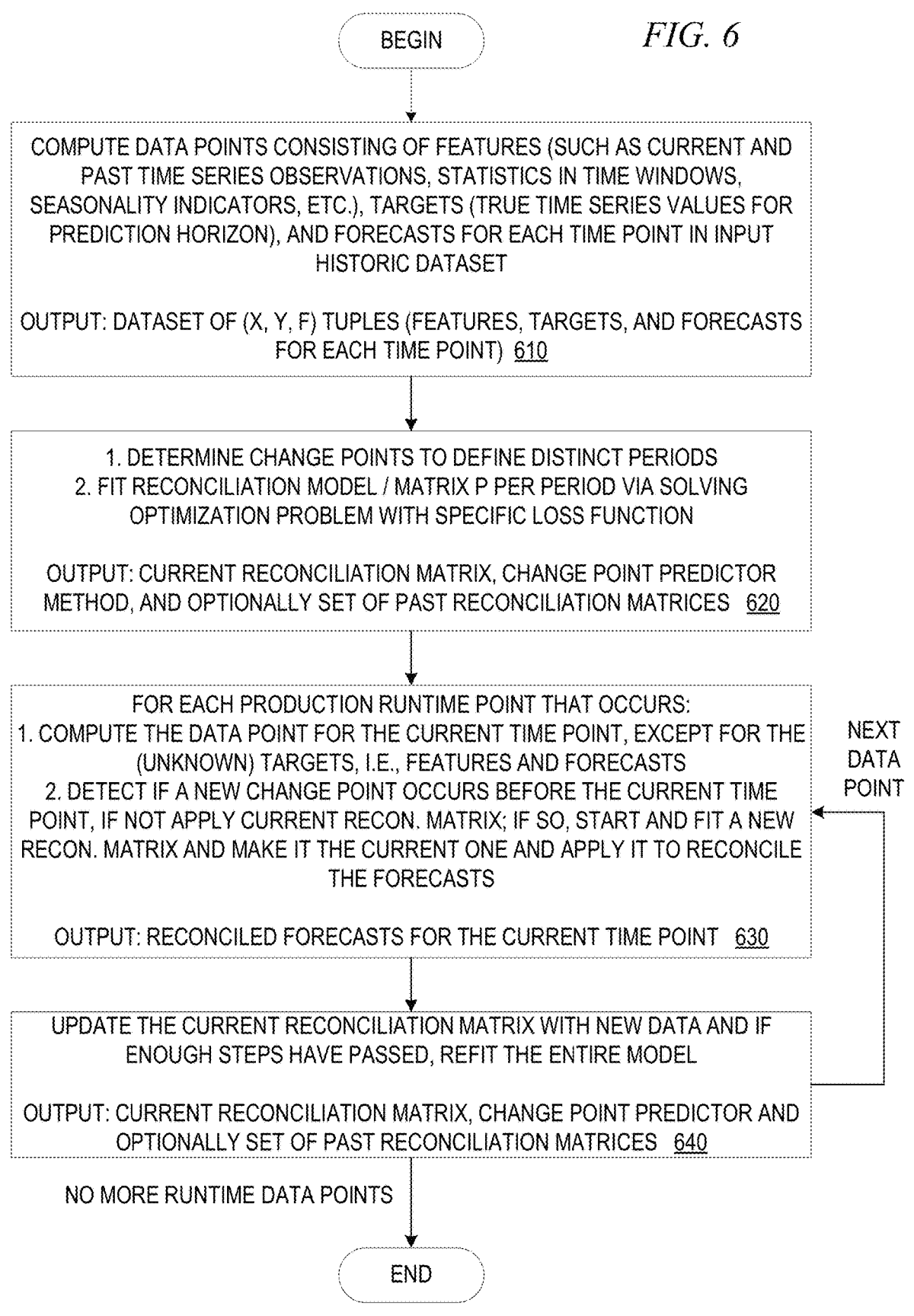

BEGIN

*FIG. 6*

COMPUTE DATA POINTS CONSISTING OF FEATURES (SUCH AS CURRENT AND PAST TIME SERIES OBSERVATIONS, STATISTICS IN TIME WINDOWS, SEASONALITY INDICATORS, ETC.), TARGETS (TRUE TIME SERIES VALUES FOR PREDICTION HORIZON), AND FORECASTS FOR EACH TIME POINT IN INPUT HISTORIC DATASET

OUTPUT: DATASET OF (X, Y, F) TUPLES (FEATURES, TARGETS, AND FORECASTS FOR EACH TIME POINT) 610

1. DETERMINE CHANGE POINTS TO DEFINE DISTINCT PERIODS
2. FIT RECONCILIATION MODEL / MATRIX P PER PERIOD VIA SOLVING OPTIMIZATION PROBLEM WITH SPECIFIC LOSS FUNCTION

OUTPUT: CURRENT RECONCILIATION MATRIX, CHANGE POINT PREDICTOR METHOD, AND OPTIONALLY SET OF PAST RECONCILIATION MATRICES 620

FOR EACH PRODUCTION RUNTIME POINT THAT OCCURS:
1. COMPUTE THE DATA POINT FOR THE CURRENT TIME POINT, EXCEPT FOR THE (UNKNOWN) TARGETS, I.E., FEATURES AND FORECASTS
2. DETECT IF A NEW CHANGE POINT OCCURS BEFORE THE CURRENT TIME POINT, IF NOT APPLY CURRENT RECON. MATRIX; IF SO, START AND FIT A NEW RECON. MATRIX AND MAKE IT THE CURRENT ONE AND APPLY IT TO RECONCILE THE FORECASTS

OUTPUT: RECONCILED FORECASTS FOR THE CURRENT TIME POINT 630

NEXT DATA POINT

UPDATE THE CURRENT RECONCILIATION MATRIX WITH NEW DATA AND IF ENOUGH STEPS HAVE PASSED, REFIT THE ENTIRE MODEL

OUTPUT: CURRENT RECONCILIATION MATRIX, CHANGE POINT PREDICTOR AND OPTIONALLY SET OF PAST RECONCILIATION MATRICES 640

NO MORE RUNTIME DATA POINTS

END

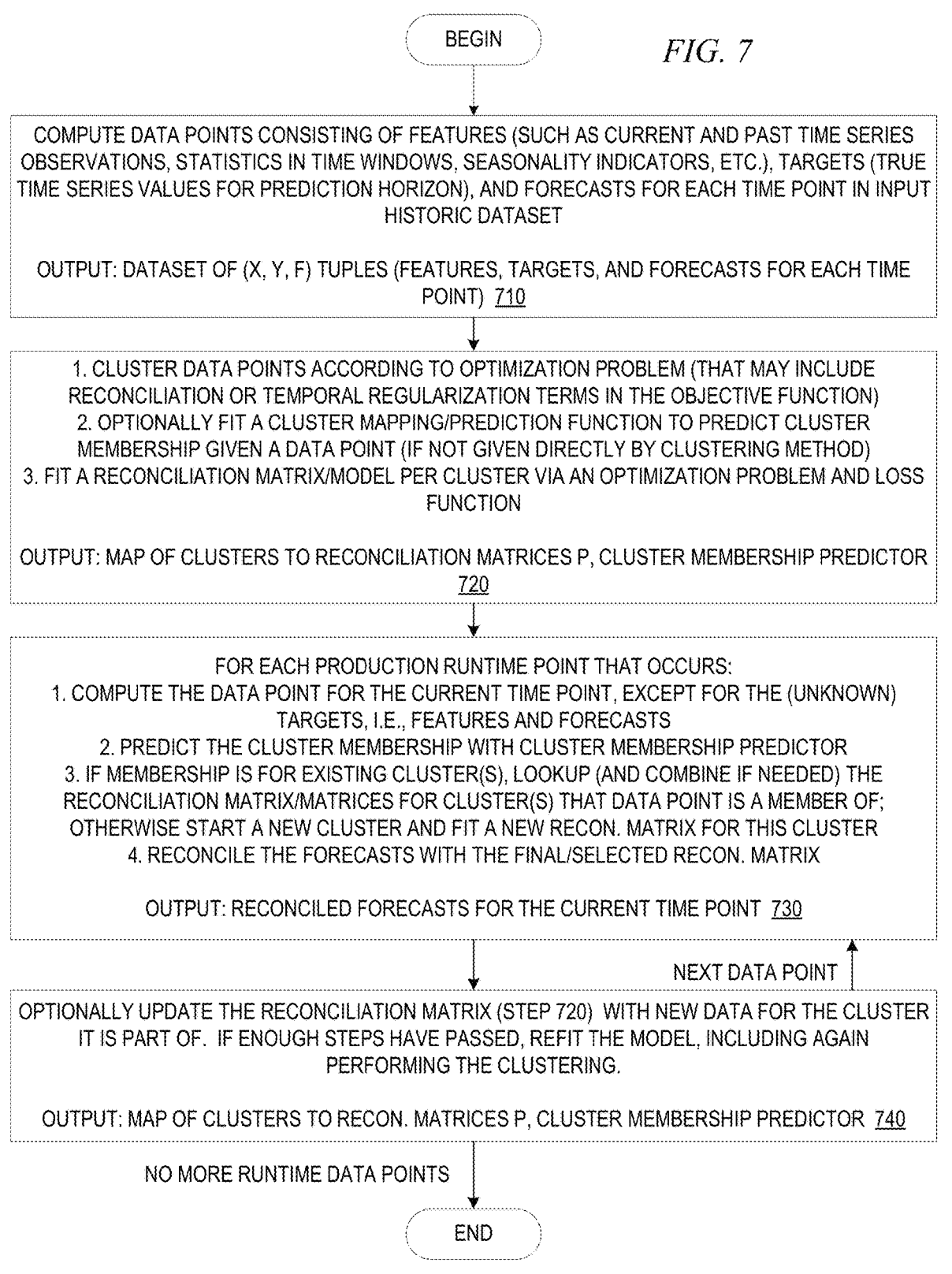

BEGIN

*FIG. 7*

COMPUTE DATA POINTS CONSISTING OF FEATURES (SUCH AS CURRENT AND PAST TIME SERIES OBSERVATIONS, STATISTICS IN TIME WINDOWS, SEASONALITY INDICATORS, ETC.), TARGETS (TRUE TIME SERIES VALUES FOR PREDICTION HORIZON), AND FORECASTS FOR EACH TIME POINT IN INPUT HISTORIC DATASET

OUTPUT: DATASET OF (X, Y, F) TUPLES (FEATURES, TARGETS, AND FORECASTS FOR EACH TIME POINT) 710

1. CLUSTER DATA POINTS ACCORDING TO OPTIMIZATION PROBLEM (THAT MAY INCLUDE RECONCILIATION OR TEMPORAL REGULARIZATION TERMS IN THE OBJECTIVE FUNCTION)
2. OPTIONALLY FIT A CLUSTER MAPPING/PREDICTION FUNCTION TO PREDICT CLUSTER MEMBERSHIP GIVEN A DATA POINT (IF NOT GIVEN DIRECTLY BY CLUSTERING METHOD)
3. FIT A RECONCILIATION MATRIX/MODEL PER CLUSTER VIA AN OPTIMIZATION PROBLEM AND LOSS FUNCTION

OUTPUT: MAP OF CLUSTERS TO RECONCILIATION MATRICES P, CLUSTER MEMBERSHIP PREDICTOR 720

FOR EACH PRODUCTION RUNTIME POINT THAT OCCURS:
1. COMPUTE THE DATA POINT FOR THE CURRENT TIME POINT, EXCEPT FOR THE (UNKNOWN) TARGETS, I.E., FEATURES AND FORECASTS
2. PREDICT THE CLUSTER MEMBERSHIP WITH CLUSTER MEMBERSHIP PREDICTOR
3. IF MEMBERSHIP IS FOR EXISTING CLUSTER(S), LOOKUP (AND COMBINE IF NEEDED) THE RECONCILIATION MATRIX/MATRICES FOR CLUSTER(S) THAT DATA POINT IS A MEMBER OF; OTHERWISE START A NEW CLUSTER AND FIT A NEW RECON. MATRIX FOR THIS CLUSTER
4. RECONCILE THE FORECASTS WITH THE FINAL/SELECTED RECON. MATRIX

OUTPUT: RECONCILED FORECASTS FOR THE CURRENT TIME POINT 730

NEXT DATA POINT

OPTIONALLY UPDATE THE RECONCILIATION MATRIX (STEP 720) WITH NEW DATA FOR THE CLUSTER IT IS PART OF. IF ENOUGH STEPS HAVE PASSED, REFIT THE MODEL, INCLUDING AGAIN PERFORMING THE CLUSTERING.

OUTPUT: MAP OF CLUSTERS TO RECON. MATRICES P, CLUSTER MEMBERSHIP PREDICTOR 740

NO MORE RUNTIME DATA POINTS

END

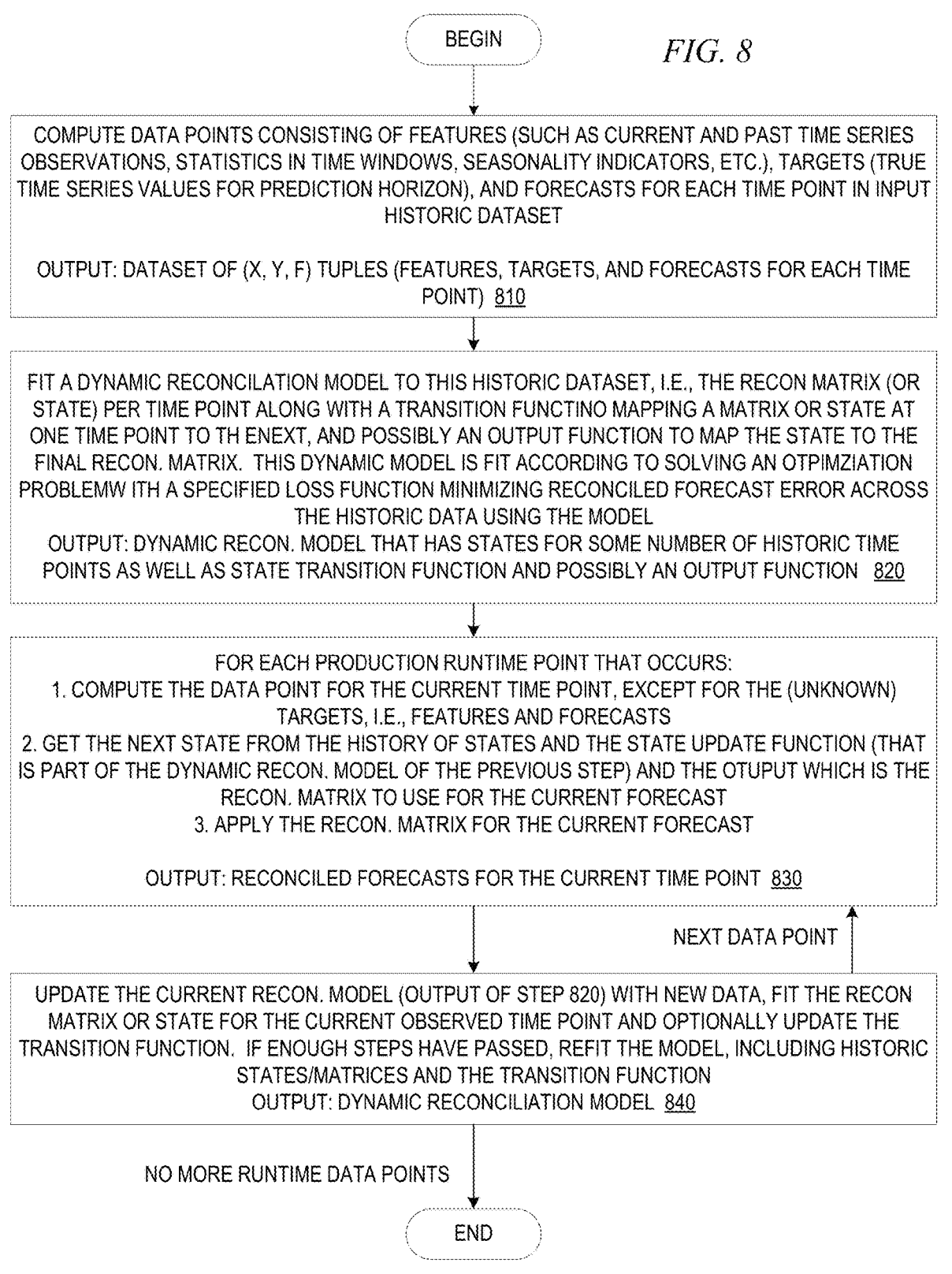

BEGIN

*FIG. 8*

COMPUTE DATA POINTS CONSISTING OF FEATURES (SUCH AS CURRENT AND PAST TIME SERIES OBSERVATIONS, STATISTICS IN TIME WINDOWS, SEASONALITY INDICATORS, ETC.), TARGETS (TRUE TIME SERIES VALUES FOR PREDICTION HORIZON), AND FORECASTS FOR EACH TIME POINT IN INPUT HISTORIC DATASET

OUTPUT: DATASET OF (X, Y, F) TUPLES (FEATURES, TARGETS, AND FORECASTS FOR EACH TIME POINT) 810

FIT A DYNAMIC RECONCILATION MODEL TO THIS HISTORIC DATASET, I.E., THE RECON MATRIX (OR STATE) PER TIME POINT ALONG WITH A TRANSITION FUNCTINO MAPPING A MATRIX OR STATE AT ONE TIME POINT TO TH ENEXT, AND POSSIBLY AN OUTPUT FUNCTION TO MAP THE STATE TO THE FINAL RECON. MATRIX. THIS DYNAMIC MODEL IS FIT ACCORDING TO SOLVING AN OTPIMZIATION PROBLEMW ITH A SPECIFIED LOSS FUNCTION MINIMIZING RECONCILED FORECAST ERROR ACROSS THE HISTORIC DATA USING THE MODEL
OUTPUT: DYNAMIC RECON. MODEL THAT HAS STATES FOR SOME NUMBER OF HISTORIC TIME POINTS AS WELL AS STATE TRANSITION FUNCTION AND POSSIBLY AN OUTPUT FUNCTION 820

FOR EACH PRODUCTION RUNTIME POINT THAT OCCURS:
1. COMPUTE THE DATA POINT FOR THE CURRENT TIME POINT, EXCEPT FOR THE (UNKNOWN) TARGETS, I.E., FEATURES AND FORECASTS
2. GET THE NEXT STATE FROM THE HISTORY OF STATES AND THE STATE UPDATE FUNCTION (THAT IS PART OF THE DYNAMIC RECON. MODEL OF THE PREVIOUS STEP) AND THE OTUPUT WHICH IS THE RECON. MATRIX TO USE FOR THE CURRENT FORECAST
3. APPLY THE RECON. MATRIX FOR THE CURRENT FORECAST

OUTPUT: RECONCILED FORECASTS FOR THE CURRENT TIME POINT 830

NEXT DATA POINT

UPDATE THE CURRENT RECON. MODEL (OUTPUT OF STEP 820) WITH NEW DATA, FIT THE RECON MATRIX OR STATE FOR THE CURRENT OBSERVED TIME POINT AND OPTIONALLY UPDATE THE TRANSITION FUNCTION. IF ENOUGH STEPS HAVE PASSED, REFIT THE MODEL, INCLUDING HISTORIC STATES/MATRICES AND THE TRANSITION FUNCTION
OUTPUT: DYNAMIC RECONCILIATION MODEL 840

NO MORE RUNTIME DATA POINTS

END

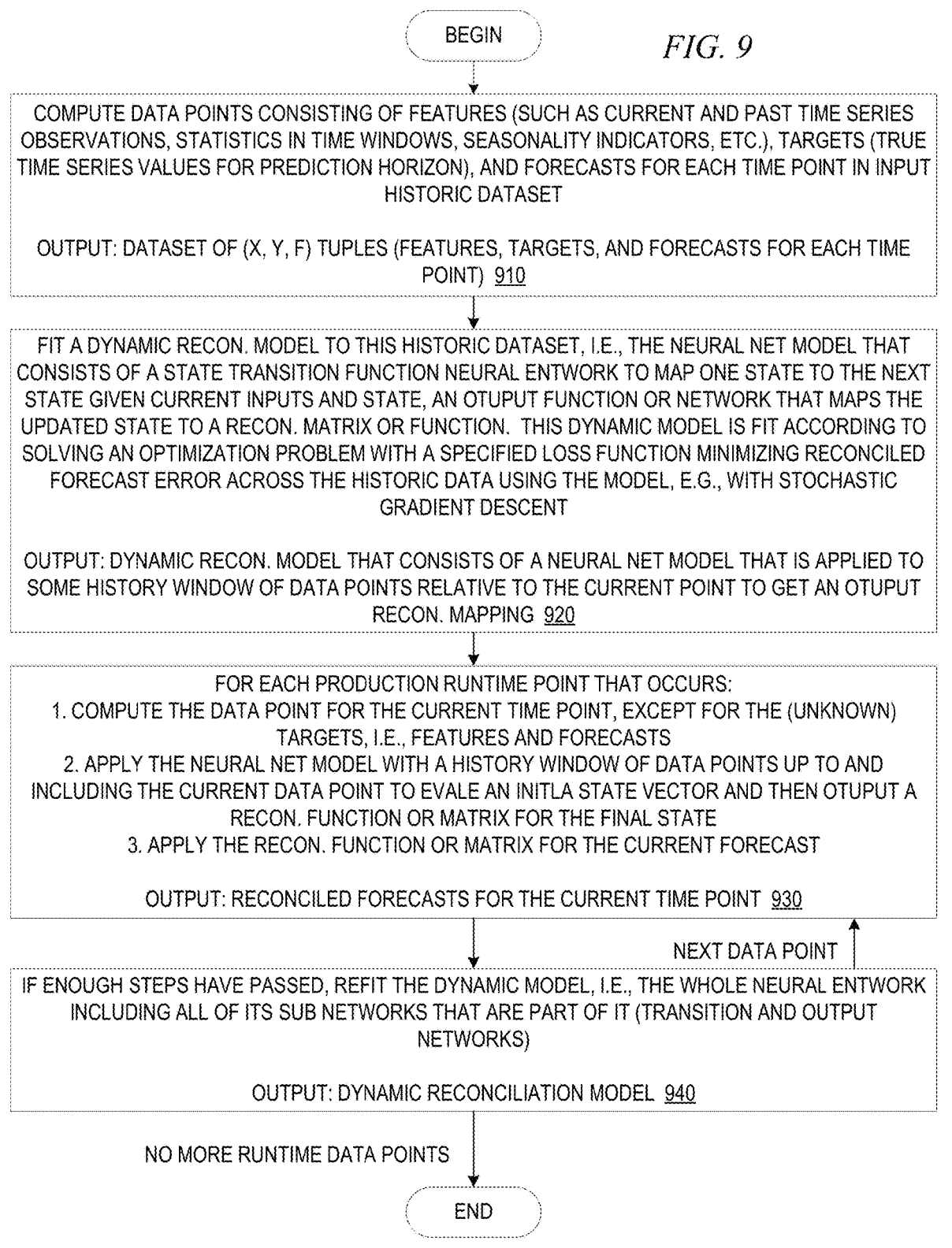

BEGIN

*FIG. 9*

COMPUTE DATA POINTS CONSISTING OF FEATURES (SUCH AS CURRENT AND PAST TIME SERIES OBSERVATIONS, STATISTICS IN TIME WINDOWS, SEASONALITY INDICATORS, ETC.), TARGETS (TRUE TIME SERIES VALUES FOR PREDICTION HORIZON), AND FORECASTS FOR EACH TIME POINT IN INPUT HISTORIC DATASET

OUTPUT: DATASET OF (X, Y, F) TUPLES (FEATURES, TARGETS, AND FORECASTS FOR EACH TIME POINT) 910

FIT A DYNAMIC RECON. MODEL TO THIS HISTORIC DATASET, I.E., THE NEURAL NET MODEL THAT CONSISTS OF A STATE TRANSITION FUNCTION NEURAL ENTWORK TO MAP ONE STATE TO THE NEXT STATE GIVEN CURRENT INPUTS AND STATE, AN OTUPUT FUNCTION OR NETWORK THAT MAPS THE UPDATED STATE TO A RECON. MATRIX OR FUNCTION. THIS DYNAMIC MODEL IS FIT ACCORDING TO SOLVING AN OPTIMIZATION PROBLEM WITH A SPECIFIED LOSS FUNCTION MINIMIZING RECONCILED FORECAST ERROR ACROSS THE HISTORIC DATA USING THE MODEL, E.G., WITH STOCHASTIC GRADIENT DESCENT

OUTPUT: DYNAMIC RECON. MODEL THAT CONSISTS OF A NEURAL NET MODEL THAT IS APPLIED TO SOME HISTORY WINDOW OF DATA POINTS RELATIVE TO THE CURRENT POINT TO GET AN OTUPUT RECON. MAPPING 920

FOR EACH PRODUCTION RUNTIME POINT THAT OCCURS:
1. COMPUTE THE DATA POINT FOR THE CURRENT TIME POINT, EXCEPT FOR THE (UNKNOWN) TARGETS, I.E., FEATURES AND FORECASTS
2. APPLY THE NEURAL NET MODEL WITH A HISTORY WINDOW OF DATA POINTS UP TO AND INCLUDING THE CURRENT DATA POINT TO EVALE AN INITLA STATE VECTOR AND THEN OTUPUT A RECON. FUNCTION OR MATRIX FOR THE FINAL STATE
3. APPLY THE RECON. FUNCTION OR MATRIX FOR THE CURRENT FORECAST

OUTPUT: RECONCILED FORECASTS FOR THE CURRENT TIME POINT 930

NEXT DATA POINT

IF ENOUGH STEPS HAVE PASSED, REFIT THE DYNAMIC MODEL, I.E., THE WHOLE NEURAL ENTWORK INCLUDING ALL OF ITS SUB NETWORKS THAT ARE PART OF IT (TRANSITION AND OUTPUT NETWORKS)

OUTPUT: DYNAMIC RECONCILIATION MODEL 940

NO MORE RUNTIME DATA POINTS

END

AUTOMATIC AND DYNAMIC ADAPTATION OF HIERARCHICAL RECONCILIATION FOR TIME SERIES FORECASTING

BACKGROUND

The present application relates generally to an improved data processing apparatus and method and more specifically to an improved computing tool and improved computing tool operations/functionality for automatically and dynamically adapting a hierarchical reconciliation process for time series forecasting.

Computer model based forecasting is used in a number of planning and resource allocation scenarios to facilitate decision making. For example, prior to, or during, a natural disaster, a utility may use computer models to forecast damage and perform crew allocation based on predicted damage forecasts. This planning and allocation helps ensure that the necessary crews and equipment are available to expedite repair of the damage and restore service. Weather and air quality forecasting computer models can be used to help citizenry, energy companies, government organizations, and the like, to prepare for unfavorable weather conditions, predict energy usage, energy availability, and the like, e.g., issuing alerts regarding dangerous weather/air quality conditions, mobilizing crews, and the like.

Computing system and resource availability forecasting allows for system administrators, site reliability engineers, and the like, to prepare for situations within a computing infrastructure by making sure appropriate measures are taken, and resources are available, to maintain the reliability and availability of the computing systems. In still another example, an online retailer, brick-and-mortar store proprietor, and the like, may use forecasting computer models to forecast demands for products, inventory availability, and the like, to make decisions to ensure sufficient inventory to fill orders during increased sale cycles, and in some cases, move inventory between locations to accommodate predicted demand in various geographical locations.

In general, any organization, industry, government agency, or the like, that seeks to predict a future scenario or condition based on previously observed scenarios/conditions may make use of forecasting computer models to make such predictions. However, it is important, that such forecasting provide coherent and consistent forecasts across the various levels of data used to make such forecasts. That is, data is often organized into hierarchies and the sum of children forecast should equal the parent forecast (coherence) in a hierarchy.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, computer-implemented method is provided that comprises executing a machine learning training operation on a dynamic reconciliation computer model engine to train the dynamic reconciliation computer model engine, based on historical data and corresponding forecast data, to learn an association of reconciliation computer models with structural changes in a hierarchical dataset. The computer-implemented method further comprises generating runtime forecast data based on a runtime hierarchical dataset and executing the trained dynamic reconciliation computer model engine on the runtime forecast data to reconcile the runtime forecast data across a hierarchy of the runtime forecast data. The trained dynamic reconciliation computer model automatically and dynamically applies different ones of the reconciliation computer models to the runtime forecast data based on structural changes in the runtime forecast data. The computer-implemented method also comprises generating reconciled runtime forecast data based on results of executing the trained dynamic reconciliation computer model engine on the runtime forecast data and outputting the reconciled runtime forecast data as part of a decision support user interface.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 2B and 2C demonstrate examples of a bottom-up and a top-down, respectively, reconciliation computing tool/model application of mapping matrices P;

FIG. 5 is a flowchart outlining an example overall operation for dynamically adapting a reconciliation model for generating reconciled forecast data in accordance with some illustrative embodiments;

FIG. 6 is a flowchart outlining an example operation for dynamically adapting a reconciliation model using a change point approach in accordance with one illustrative embodiment;

FIG. 7 is a flowchart outlining an example operation for dynamically adapting a reconciliation model using a cluster based approach in accordance with one illustrative embodiment;

FIG. 8 is a flowchart outlining an example operation for dynamically adapting a reconciliation model using a stochastic process based approach in accordance with one illustrative embodiment;

FIG. 9 is a flowchart outlining an example operation for dynamically adapting a reconciliation model using a deep learning based approach in accordance with one illustrative embodiment.

DETAILED DESCRIPTION

Forecasting computer models many times utilize hierarchical datasets, e.g., time series datasets, to provide historical data upon which the forecasting computer model operates to generate forecast predictions. A time series dataset is a collection of data representing observations or measurements obtained through repeated measurements over time, and may be represented as a sequence of these observations/measurements with corresponding timestamps. For example, sales data may represent number of sales of one or more products at various points or ranges in time, e.g., seasons or time periods such as quarterly, monthly, etc., or even event based time periods, such as during a particular annual sale, during a promotion period, or the like. The time series datasets, e.g., sale data, may have various characteristics, such as sales price, numbers of units sold, geographic region sold, and a plethora of other data pertinent to evaluating the state of an organization, business, or the like, with regard to that product or product(s).

This time series dataset may be used with forecasting computer models to train the forecasting computer models, e.g., neural networks and other artificial intelligence computer models, to make forecasts based on patterns of input features extracted from the historical time series dataset. In this way, the forecasting computer model is able to provide predictions, or forecasts, regarding future states that may serve as a basis for decision making. It should be appreciated that while the illustrative embodiments will be described with regard to a time series dataset, the illustrative embodiments are not limited to such, and instead may be applied to any hierarchical dataset, whether that hierarchy represents a physical hierarchy, a temporal hierarchy, or other logical hierarchy.

Figure 1:
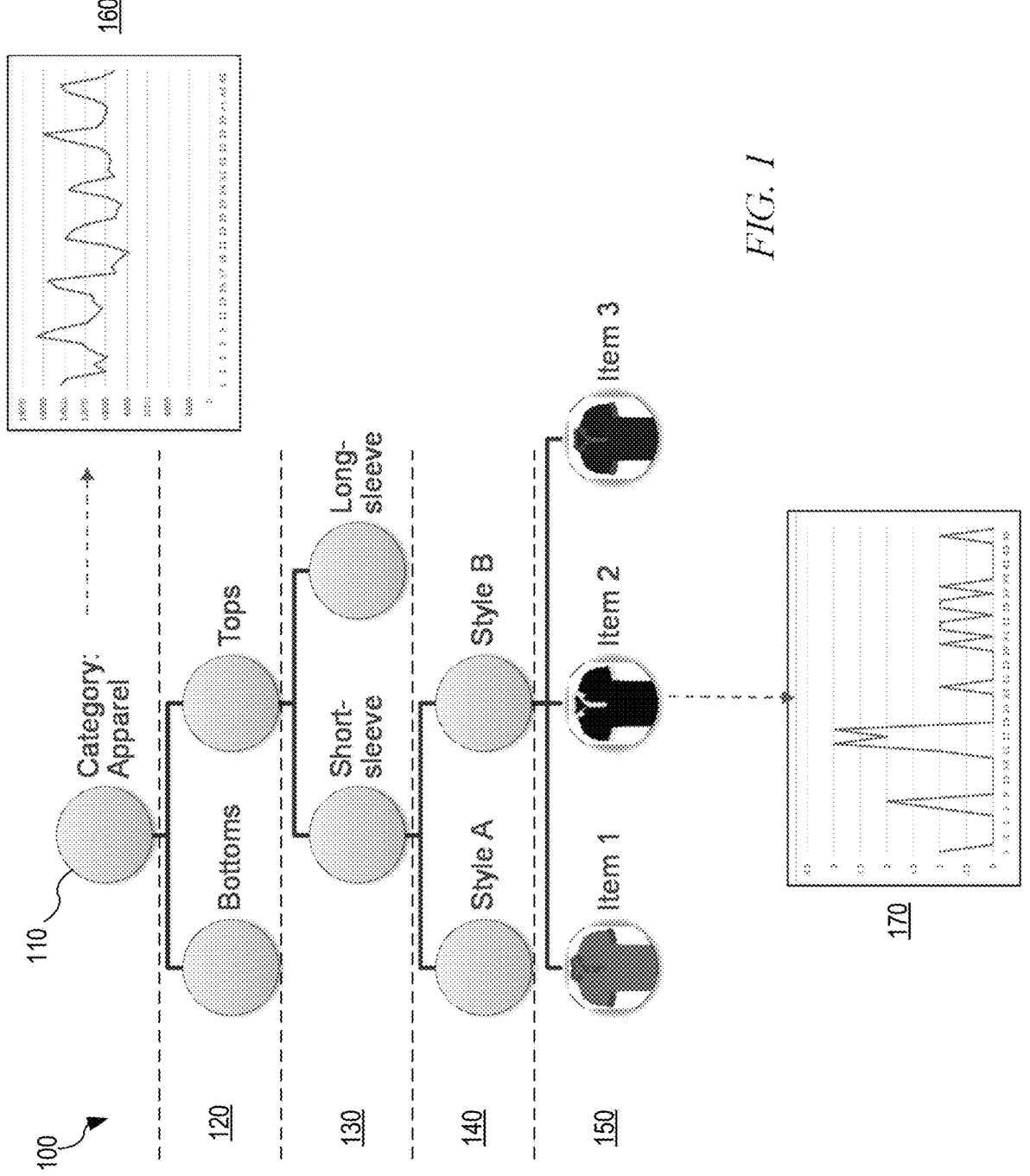
FIG. 1 is an example diagram of a product hierarchy and corresponding sales data at different levels of the hierarchy in accordance with one illustrative embodiment.

Many times, these time series datasets exhibit hierarchical structure, either cross-section, temporal, or both. For example, consider the product hierarchy example shown in FIG. 1. The example of FIG. 1 shows a product hierarchy 100 in which a highest depicted level 110 is the category "apparel" which has lower levels of the hierarchy 120-140 nested in a tree-like hierarchical arrangement. That is, for example, the level 110 of "Category:Apparel" can be further categorized into "bottoms" and "tops" at lower level 120. The "tops" category of products can further be categorized into "short-sleeve" and "long-sleeve" in the lower level 130. The "short-sleeve" category may be further categorized into "Style A" and "Style B" in the lower level 140. Thereafter, the "Style B" category may be further categorized into specific products "Item 1", "Item 2", and "Item 3" in the lowest depicted level 150. Thus, time series datasets may be provided with regard to one or more of these levels and forecasting computer models need to be coherent regardless of the levels at which the time series datasets are provided. That is, the same forecasts, or at least consistent forecasts, should be made if the time series datasets provide data at level 150 as well as at level 110. Specifically, for a given tree hierarchy, the forecast for a node should equal the sum of the forecasts for its children, for the forecasts to be coherent. For example, in FIG. 1, a forecast for "short-sleeve" should equal the sum of the forecasts for "Style A" and "Style B", and a forecast for "Tops" should equal the sum of the forecasts for "short-sleeve" and "long-sleeve", etc.

Generating forecasts at different levels of the hierarchy can provide different insights into potential future states and drive different operations and decisions for businesses and institutions. For example, forecasting at higher levels of the hierarchy aggregates the lower levels of the hierarchy and can be more accurate at capturing aggregate patterns and generating forecasts based on aggregate patterns. For example, the large scale trend data 160 can identify seasonality and larger aggregate patterns to better forecast patterns when the time series data is aggregated bottom-up to higher hierarchy levels. Forecasting at lower levels of the hierarchy can more accurately incorporate local effects and drive decisions, such as inventory management and the like. However, these forecasts need to be coherent in order to have coherent decision making across the various levels of the hierarchical time series datasets. For example, the sales data 170 at the lowest level 150 of the hierarchy can better represent intermittent sales data and capture localized effects to identify local trends.

Thus, generating forecasts at different levels of the hierarchy are important to decision making, and different forecasts may be generated for, and used by, different groups within an organization. The forecasts themselves may make use of different machine learning trained computer models implementing different methodologies. However, making decisions on the basis of inconsistent, and in some cases, contradictory, forecasts will introduce error into the decision making process. That is, in order for forecasts to be of use in providing decision support, the forecasts need to be coherent across all levels of the hierarchy and have as high an accuracy as possible.

Forecast reconciliation computing tools and computing models are one way in which to achieve coherent forecasts at the various hierarchical levels. Such forecast reconciliation computing tools/models leverage specialization and differing abilities of forecasts at different hierarchy levels to improve forecast accuracy. Forecast reconciliation generally selects one or more levels of the hierarchy for which forecasts are to be generated and then makes adjustments to represent the forecast at different levels of the hierarchy. There are different techniques for forecast reconciliation, where the most basic involves reconciliation of forecasts at a single level and then mapping the forecast to other levels. The more sophisticated and effective methods take forecasts from all levels, and then adjust them all by leveraging the information from all levels.

Some methods for forecast reconciliation are referred to as top-down forecasting, bottom-up forecasting, and proportional forecasting. In top-down forecasting, the forecast is generated at the top level of the hierarchy and proportions, based on conditional forecasts given the forecast at the top-level, are used to generate forecasts at lower portions of the hierarchy. A bottom-up forecasting process generates the forecast at the bottom level of the hierarchy and aggregates the forecasts at lower levels up the hierarchy. Other middle-out forecasting is essentially a combination of top-down and bottom up forecasting in which a middle level of the hierarchy is selected for forecasting and then this forecast is aggregated up to higher levels and is proportionally propagated down the lower levels of the hierarchy.

Reconciliation is a process of mapping base forecast data to a reconciled forecast space which is consistent across all levels of the hierarchy of the input dataset, i.e., the forecast data is made coherent. Most reconciliation methods essentially utilize a mapping matrix M to map the set of all forecasts to this reconciled forecast space. Different reconciliation computing tools/models utilize different mapping matrices M to perform such reconciliations, where M is determined using very different functions depending on the particular reconciliation computing tools/models. The reality is that these functions and mapping matrices M work well for some time series datasets and do not work as well for others. Thus, there is a large variety of reconciliation computing tools/models and their corresponding mapping matrices M and corresponding functions for developing the mapping matrices M, which may be accurate, or inaccurate, depending on the particular time series dataset that is used (including particular time periods) as input to the forecasting computer models, and the particular forecasting computer models used.

Figure 2A:
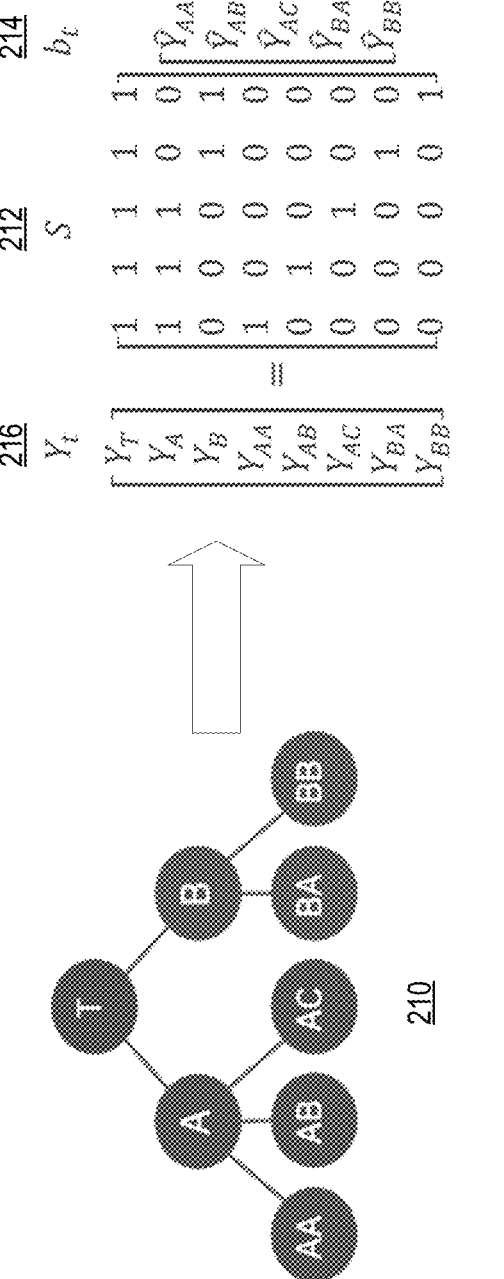
FIG. 2A is an example diagram demonstrating a base or simple reconciliation computing tool/model's mapping matrix P and a corresponding hierarchy of time series data.

FIGS. 2A-C, provide examples demonstrating simple reconciliation computing tool/models' mapping matrices, each decomposed as a projection matrix P and summing matrix S, and a corresponding hierarchy of time series data. FIG. 2A illustrates the summing matrix S for an example hierarchy, where the projection matrix P is a matrix applied to a starting forecast matrix (from all levels) that maps them to the set of lowest-level (base) forecasts. The result is then multiplied with S to get the final reconciled forecasts. Because S is summing the adjusted forecast bottom up, the final set of forecasts are guaranteed to be coherent.

As shown in FIG. 2A, assume that there is an input time series dataset having a hierarchy as shown in tree data structure 210 of FIG. 2A, where each node represents a classification of the data at different levels of the hierarchy and edges represent relationships between the classifications of the data, e.g., a hierarchy of "Tops" (T)->"Short Sleeved" (A)->"Item1" (AA), "Item2" (AB), "Item3" (AC). Portions of the input dataset are associated with the nodes, where each parent node is an aggregate of its child nodes. The tree data structure 210 may be determined from the structure of the time series datasets that is input, a temporal hierarchy, or the like.

The structure of the hierarchy is captured through the summing matrix S 212, applied to $b_t$ 214 which is the lowest-level observations, e.g., $\widehat{Y_{AA}}$, $\widehat{Y_{AB}}$, etc. $Y_t$ 216 are all the observations in the hierarchy, e.g., $Y_T$, $Y_A$, $Y_B$, $Y_{AA}$, etc., where these observations are a combination of subsets of the lowest-level observations. For example, the values of S for $Y_T$ are all "1" indicating that $Y_T$ is a combination of all of the lowest-level observations. However, the values of S for $Y_B$ are 1's only for $\widehat{Y_{BA}}$ and $\widehat{Y_{BB}}$. Thus, when the summing matrix S is applied to the lowest-level observations, one gets the entire structure of the hierarchical tree data structure 210, i.e., $Y_t = Sb_t$, if only the base level forecasts are used. This amounts to what is termed the "bottom-up reconciliation" method. This has the advantage of guaranteeing coherency as, by design, the sum of the forecasts of each set of children will equal their parent forecast. The disadvantage, however, is that this ignores forecasts from other levels in the hierarchy, which as mentioned above, can provide useful information and be more accurate.

Therefore, in order to automatically ensure coherency while factoring in information from all level forecasts, reconciliation methods may take the approach of, or can be modeled as, applying a mapping, or projection, matrix P from all forecasts to just the base level (lowest level) forecasts, followed by applying the fixed bottom-up summing matrix S. That is, reconciliation methods may use M=SP as the reconciliation mapping matrix in order to ensure coherency automatically, where M is the overall reconciliation map from all forecasts to all forecasts, and P refers to a specific part of the reconciliation map (the part projecting all forecast to the base forecasts). This specific structure of M does not limit the flexibility (as the adjusted base level forecasts can still depend on all forecasts) while having the major benefit of ensuring coherency without having to solve a more complicated constrained optimization which would be necessary if one tries to find an M directly.

Thus, when performing a reconciliation of forecasts, a mapping matrix P is introduced to the evaluation, i.e., rather than $Y_t = Sb_t$ where $b_t$ consists only of the bottom-level forecasts, the reconciliation involves an evaluation of $\tilde{Y}_t = SP\hat{Y}_t$, where $\hat{Y}_t$ are the forecasts from all levels in the hierarchy, including the bottom level and all aggregate levels, and $\tilde{Y}_t$ are the reconciled forecasts for all levels. The issue is that reconciliation computing tools/models use different formulations for specifying the mapping matrix P and have different levels of accuracy based on a large complex combination of factors which cannot be reasonably considered through manual processes with any expected level of accuracy. That is, evaluating the many different features of time series datasets, the many different features of different forecasting computer models, and the many different features of reconciliation computing tools/models, and then also evaluating the various combinations of these features, is not practical as a mental or manual process.

FIGS. 2B and 2C demonstrate examples of a bottom-up and a top-down, respectively, reconciliation computing tool/model application of mapping matrices P 230, 240 as well as equations for two example sophisticated reconciliation formulations, MinT and ERM, below each illustration that factor in information from all forecasts. The bottom-up example 230 simply ignores other level forecasts and keeps the bottom-level unchanged before applying the summing matrix, S, to this to get the reconciled forecasts. The optimal linear/MinT shown at the bottom is obtained as the solution to a particular optimization problem, which is described in Wickramasuriya et al., "Optimal Forecast Reconciliation for Hierarchical and Grouped Time Series through Trace Minimization," J. American Statistical Association, 114 (526), 804-819, Jun. 14, 2019. The top-down example 240 uses just the top hierarchy level forecast only, ignoring the rest, and learns weights to disaggregate this top level to the bottom level, before then applying the summing matrix. Shown below it is the formula for one version of an empirical risk minimization reconciliation method, which is described in Taieb et al, "Regularized Regression for Hierarchical Forecasting Without Unbiasedness Conditions," KDD'19: Proceedings of the 25th ACM SIGKDD International Conference on Knowledge Discovery and Data Mining, pages 1337-1347, July 2019.

As is shown in FIGS. 2B and 2C, the mapping matrices P 230, 240, and the formulas below, have different values for entries of the mapping matrices P 230, 240, and the formulas below, which are generated using different formulations and thus, will provide different levels of accuracy depending on the particular forecast input data, which is itself dependent upon the particular forecast models, and further on the input time series datasets. As can be seen from FIGS. 2B and 2C, there are many different reconciliation computing tools/models with different formulations that provide different levels of accuracy.

Knowing which reconciliation computing tool/model will generate the most accurate reconciliation of forecast data is something that, in general, cannot be performed a priori. As a result, users utilize a plurality of different tools/models and use brute-force exhaustive searches for a best tool/model. This is a very time consuming and resource consuming process. In some cases, because of this time consuming and resource consuming brute force method, some users choose not to pursue such exploration of alternatives and instead simply select one tool/model which may not be the most effective and may not provide the most accurate forecasts for the time series datasets that they utilize. Furthermore, each reconciliation method is typically applied to the historical training data to derive one fixed or static reconciliation model, e.g., one P matrix, that is applied to reconcile forecasts at all future time points, and that itself does not change over time. However, time series datasets are inherently dynamic and nonstationary. That is, such time series datasets vary and change over time which means the relationships between them are likely to change over time as well. As a result, the reconciliation method and matrix that works best at one point in time, may not work best at another point in time. Thus, using a fixed reconciliation method or model/matrix for all time points or time regions can lead to sub-optimal reconciliation and inaccurate reconciled forecasts.

Figure 3A:
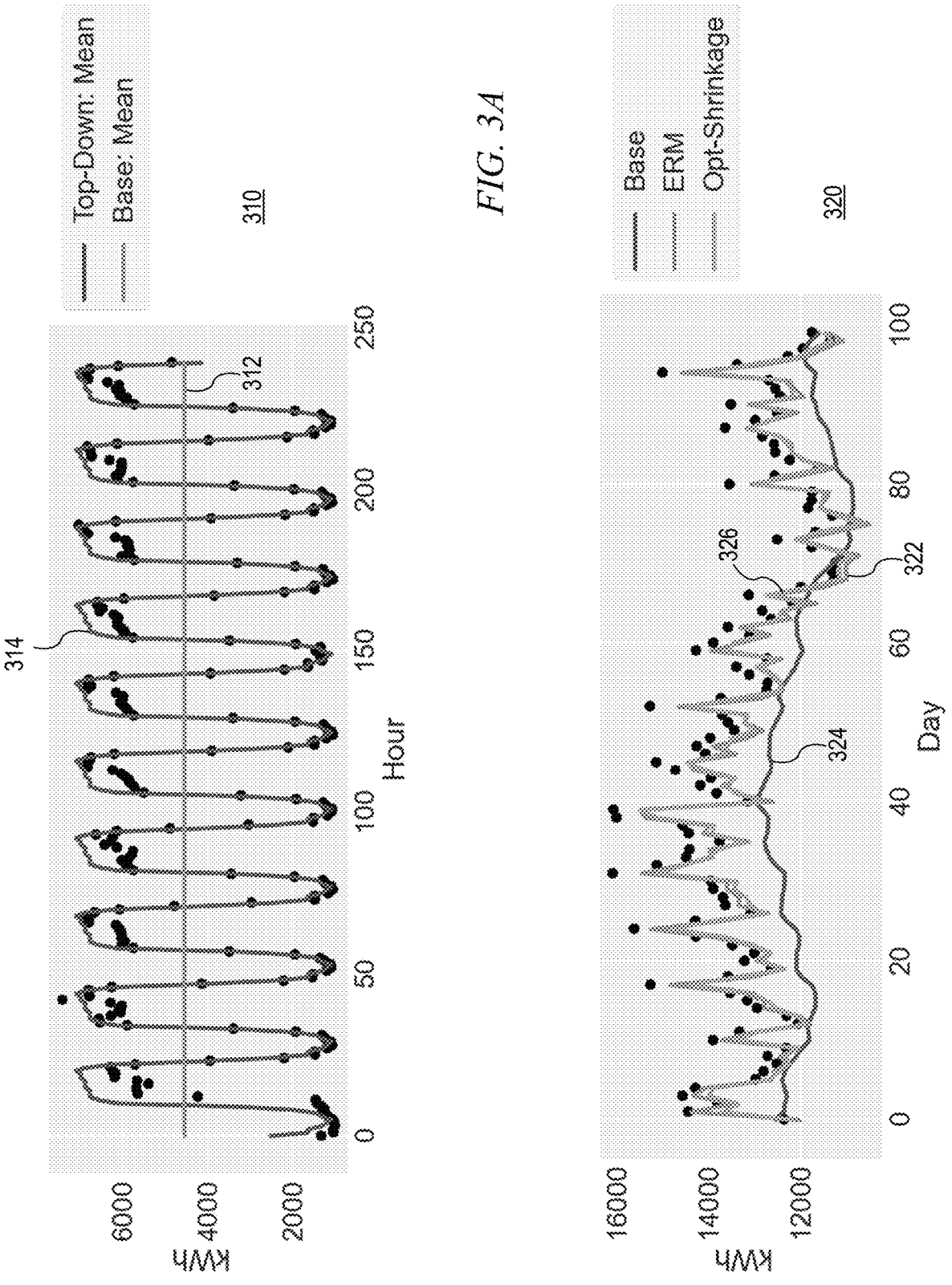
FIG. 3A is an example diagram demonstrating the accuracy of different reconciliation computing tools/models.

For example, FIG. 3A demonstrates the accuracy of different reconciliation computing tools/models. In the graphs 310 and 320 of FIG. 3A, the dots represent actual forecasted data points and the base line 312, 322 represents a base, or simple, reconciliation computing tool or model. The lines 314 and 324, 326 represent different more complex reconciliation computing tools or models. The graph 310 demonstrates that the base model forecast 312 is just as accurate to more complex reconciliation computing tools or models with some time series datasets. This is shown by the fact that the lines 312, 314 closely match each other and fit well to the true data points. The graph 320, however, demonstrates that the base or simple reconciliation computing tools/models have very poor accuracy to some time series datasets and are significantly less accurate than more complex reconciliation computing tools/models. Thus, in this case, it would be a poor choice to use a base reconciliation computing tool/model to perform reconciliation of forecasts and instead, a more complex reconciliation computing tool/model should be utilized. However, it is not known a priori which reconciliation computing tools/models work well with which time series datasets and forecasting computing models. As a result, one either selects a reconciliation computing tool/model and accepts the inaccuracy of the selected reconciliation computing tool/model in some situations, or one must use the brute force method described above and use many different reconciliation computing tools/models, which is a very time consuming and resource intensive process, and determine after the fact which reconciliation computing tool/model provided the most accurate result.

Adding to this problem is the fact that the relationship amongst the time series data, and patterns inherent in them (such as trends, seasonal/cyclical patterns, variance, etc.), themselves can change over time. That is, with real-world time series datasets, there will likely be structural changes, i.e., changes in the underlying unobserved joint probability distribution of the hierarchical set of time series governing their progression over time and observations at various points in time. Different reconciliation computing tools/models may provide better results at different times and under different conditions or context, where "better" refers to improved or more coherent and accurate forecast results, i.e., more closely aligned with the actual real world data. These are referred to as "structural" changes as the structure of the joint distribution itself contains the changes. For example, there could be a relationship between two time series in the hierarchy where there was not a relationship before, or vice versa, or the marginal distribution governing an individual time series could change. For example, during a pandemic the demand for products over time changes drastically, with some product, like hand sanitizers, that may have only been less frequently and periodically purchased, suddenly seeing spikes in demand following much different temporal patterns as well. As another example, when a product promotion or sale occurs, demand can shift between products and also substitutability between products can change, which amounts to changing the relationship between different time series representing the demand for these different products (and this can also be at aggregate category levels as well).

In general there are many examples of common occurrences that can cause structural change, such as introducing new offerings, e.g., items, into the hierarchy, unforeseen events, such as the effects of a pandemic and corresponding shutdowns or disruptions in supply chains, trends, seasonality, and the like, all are potential occurrences that may introduce structural changes that will affect the performance of a reconciliation computing tool/model, and can change or occur over time or at different periods of time. While the reconciliation computing tool/model may have previously provided coherent and accurate results, after the introduction of a structural change, that reconciliation computing tool/model may no longer provide coherent and accurate results, or at least not the best results of available reconciliation computing tools/models. That is, forecast reconciliation computing tools/models are static and based on the structure in the historical training period, whereas time series datasets are non-stationary and change over time. Thus, for example, if there is a new sales promotion or trend that causes a shift in shirt demand to one style over another, the forecast reconciliation computing tools/models should be able to adjust in aligning local forecasts with aggregate level demand forecast, however current mechanisms do not provide such dynamic adjustment of forecast reconciliation computing tools/models. Moreover, practitioners only detect that the forecast reconciliation computing tool/model being used is not providing coherent and accurate results after the forecasts have been produced and reconciled, and then compared to ground truth (actual data), i.e., it is an "after-the-fact" detection and is not preemptive.

Furthermore, with the reconciliation approaches, even if the model is updated after the fact with new data, until a large amount of new data is collected and out-weighs the previous historical data, the reconciliation models or matrices derived by the methods would not change much as they would still be influenced by the large amount of the historical data before the change. Even in that case, or more generally in the case of multiple different regimes of underlying time series structures, these methods are essentially guided by averaging between results from different time periods/regimes where the time series have different structures. That is, they may return a reconciliation model that tries to perform well under all the different observed regimes but as a result cannot perform best for any of them. Additionally, practitioners typically look to the base forecast models themselves (used to derive the initial set of forecasts) for issues and improvement, if there are errors, as opposed to the reconciliation method in particular.

Figures 3B, 3C:
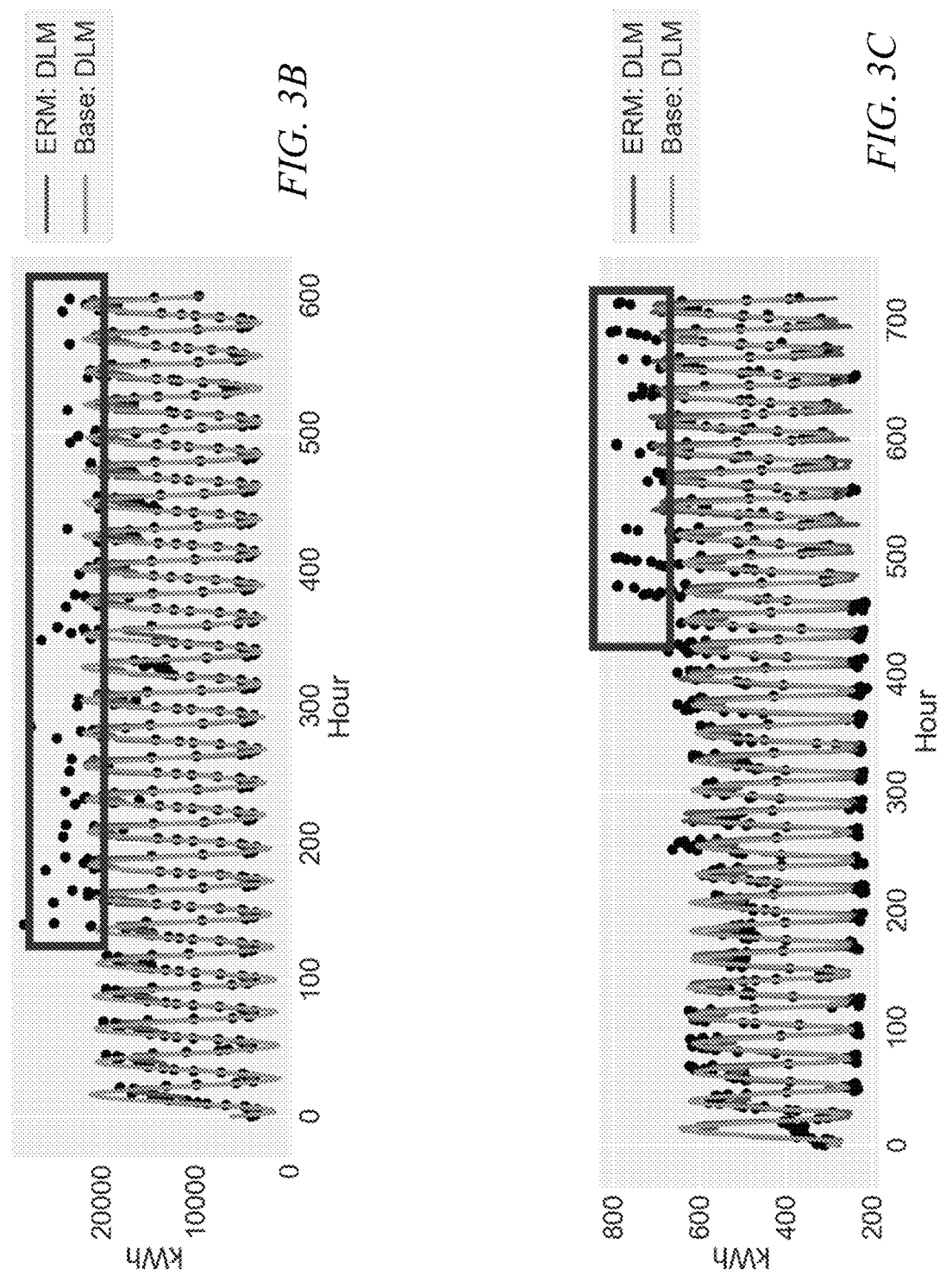
FIGS. 3B and 3C are example diagrams demonstrating areas of forecast data where static reconciliation generates inaccurate results.

FIGS. 3B and 3C provide example graphs similar to FIG. 3A, but more clearly demonstrating time periods in which the reconciliation computer tool/model utilized generates very inaccurate results due to structure changes in the time series dataset. As shown in FIG. 3B, while the reconciled forecasts fit well in general, there are time periods where, due to changes in the time series dataset, such as represented by the data points 330, the reconciliation computer tool/model does not accurately fit the data and thus, the structural changes in the time series data hurt the performance of the reconciliation computing tool/model with regard to accuracy. FIG. 3C shows another example in which the region 340 is another example of a time period where the static reconciliation computer tool/model generates poor results.

In particular, in both FIGS. 3B and FIG. 3C a clear, consistent, and predictable sinusoidal pattern is observed for some historical time period, but during the time regions shown in the boxes 330, 340, this pattern clearly and observably changes, which can be viewed as a structural change, i.e., a change in the distribution of values observed as a function of time. In FIG. 3B during the changed time regime 330, the temporal sinusoidal pattern has a higher amplitude, and a higher variance/different distribution of values such that this distribution has a longer tail (a chance of having some higher values during the peaks of the sinusoidal pattern). Similarly, in FIG. 3C, there is a trend in region 340 introduced (causing values to increase as a function of time) or level shift, possibly multiplicative or in combination with increased amplitude. These are structural changes in the pattern (or distribution) of the time series values. In this simple case with one time series and clear patterns, one can visually observe these changes, but there is a lack of data and information to know what caused these changes. In general, there can be any number of hidden causes, such as different kinds of events such as local events (e.g., a parade or fair or market), or weather, or closures for work, school or businesses, etc. In general, there is some underlying cause for such shifts but it is most often unobserved. Even if it is known or suspected, it can be difficult to account for in modeling.

With existing methods, the reconciliation computing tool/model is static and thus, the mapping matrix P is fixed. This is because the existing reconciliation computing tools/models fit the mapping matrix P using statistics and attempting to minimize error across all historical data. As a result, these solutions miss differences for different time periods and there is no specialization of the reconciliation based on the context or time series regime. Thus, if there are any changes in what mapping matrix P is best for different time periods, this will be completely missed by existing mechanisms and errors will be observed for various time periods. This leads to sub-optimal decisions and significantly increased costs or losses due to decision making being performed based on poorly formulated and reconciled forecasts.

The illustrative embodiments, on the other hand, provide an improved computing tool and improved computing tool operations that automatically and dynamically adapt a hierarchical reconciliation process for time series forecasting based on structural changes in the time series datasets. The improved computing tool and improved computing tool operations provide a dynamic reconciliation functionality that is specialized for different time periods and allows for forecast accuracy to be consistently improved since the reconciliation functionality adapts to observed values and trends such that the best reconciliation can be applied for a given context. The illustrative embodiments provide mechanisms for adapting the mapping matrix P over time based on changes in the time series (TS) dataset and forecasts. By adapting the mapping matrix P, with the adaptable mapping matrix being referred to herein as a reconciliation matrix $(P_t)$, a more optimal reconciliation is able to be obtained that better fits the data in the TS dataset, e.g., different seasons or periods may result in different forecasts and time series characteristics, and may require different reconciliation matrices or functions that are optimal for those periods, which is missed with prior art static reconciliation approaches that provide sub-optimal reconciliation. Moreover, by being able to quickly adapt the reconciliation matrix based on detected changes to the time series and forecast data, a more rapid forecast accuracy recovery in the event of such changes is made possible.

The improved computing tool and improved computing tool operations of the illustrative embodiments may be implemented in a variety of different ways but generally include a first stage of operation in which the reconciliation computing tool/model is trained on historical data, and a second stage in which the trained reconciliation computing tool/model is applied during testing and/or runtime usage. What occurs in these stages may be different depending on the particular embodiments and implementations selected.

The following description will detail four example embodiments for providing a dynamic reconciliation computing tool/model for use with a forecast reconciliation computing system, each of which implements the two stages noted above, but in different ways. A first embodiment is referred to as the change point detection based approach which operates by identifying change points in historical data and learning the optimum reconciliation computer tool/model for the different periods between and after change points in a time series dataset. The machine learning training uses the time series dataset, forecast data, and forecast errors to fit the reconciliation matrix P. Thus, a mapping between change points and reconciliation matrices P may be generated. Thereafter, during runtime operation, when the change point is detected, the corresponding learned reconciliation matrix P may be applied to the forecast data to perform reconciliation of the forecast data, or a new reconciliation matrix P may be created and used based on data at and after the change point (for example, a change in time series structure is detected, so a new reconciliation matrix is fit using new data, biased towards an uninformative prior with strength inversely proportional to the amount of new data).

A second embodiment is referred to as the cluster based approach and operates by clustering time points into groups and learning a function to predict time point cluster membership based on the properties of the forecasts and time series dataset. Then, for each cluster of time points, a corresponding reconciliation matrix P is determined. This generates a mapping of time points to corresponding reconciliation matrices P. Thereafter, during runtime operation, when the various time points are encountered, the corresponding reconciliation matrix P may be applied to the forecast data, thereby allowing for dynamic adaptation of the reconciliation computing tool/model used to generate reconciled forecast data. This enables automatically applying the most optimal reconciliation mapping for each time series regime (time period with particular time series structure or joint distribution) encountered. For example, time series corresponding to sensor measurements of instrumented devices and machines in a manufacturing center may be in multiple regimes based on what machines are operating and in what modes. For example, some may be switched to operate in low power mode at different times, or may behave differently when operated at different times of day or year or at different temperatures. This approach enables automatically finding and applying the best reconciliation approach for a given time period/operating regime.

A third embodiment is referred to as a stochastic process based approach which treats the reconciliation matrix P as a time series/stochastic process itself rather than a static matrix. The time based reconciliation matrix P(t) is fit to the observed data so that it evolves over time as it matches the time series dataset and/or forecast data. For example, a Bayesian technique may be used to update and estimate the most likely states given newly observed data.

A fourth embodiment is referred to as the deep learning approach and operates by fitting a deep learning temporal computer model, such as a recurrent neural network state based computer model. The model evolves over time and outputs a reconciliation matrix P, or directly outputs the reconciled (updated) base forecast data or adjustments to the base forecast data, which are fitted to optimize reconciled forecast accuracy across observed data.

The first and second approaches follow a similar set of overall operations for performing the first and second stages noted above, but with the individual implementations of these operations being different based on the different approaches. The third and fourth embodiments also follow a similar set of overall operations for performing the first and second stages noted above, again with individual implementations of these operations being different based on the different approaches. While these embodiments will be described in detail separately hereafter, it should be appreciated that those of ordinary skill in the art will recognize that hybrids of these embodiments, combinations of these embodiments, and other approaches for providing a dynamic reconciliation computing tool/model for forecast data may be used without departing from the spirit and scope of the present invention.

Each of these approaches provides an improved computing tool and improved computing tool operations that automatically adapts the reconciliation computing tool/model (hereafter referred to as simply the reconciliation model) to structural changes in the time series dataset and/or forecast data. By automatically and dynamically adapting the reconciliation model to the characteristics of the time series dataset and/or forecast data, optimum accuracy and coherency of the reconciled forecast data is maintained even in the case of changes that would cause static or fixed reconciliation models to generate inaccurate or non-coherent results.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As described above, the illustrative embodiments of the present invention are specifically directed to an improved computing tool that automatically and dynamically adapts a reconciliation model for reconciling forecast data with regard to a hierarchical dataset, e.g., a time series dataset. In particular, the illustrative embodiments provide an artificial intelligence (AI) based computing tool that automatically, through machine learning processes, learns an association of reconciliation models, such as the reconciliation matrices used by the reconciliation models, with structural changes in the hierarchical dataset and/or forecast data. All of the functions of the illustrative embodiments as described herein are intended to be performed using automated processes without human intervention. While a human being may initiate operation of the illustrative embodiments and/or provide some of the input data used by the mechanisms of the illustrative embodiments, the illustrative embodiments of the present invention are not directed to actions performed by the human being but rather logic and functions performed specifically by the improved computing tool based on the machine learning training of the machine learning computer model and/or automated rule generation engine. Moreover, even though the present invention may provide an output that ultimately assists human beings with regard to making decisions based on forecasts, the illustrative embodiments of the present invention are not directed to actions performed by the human being viewing the results of the processing performed by the illustrative embodiments, but rather to the specific operations performed by the specific improved computing tool of the present invention. Thus, the illustrative embodiments are not organizing any human activity, but are in fact directed to the automated logic and functionality of an improved computing tool.

Figure 4A:
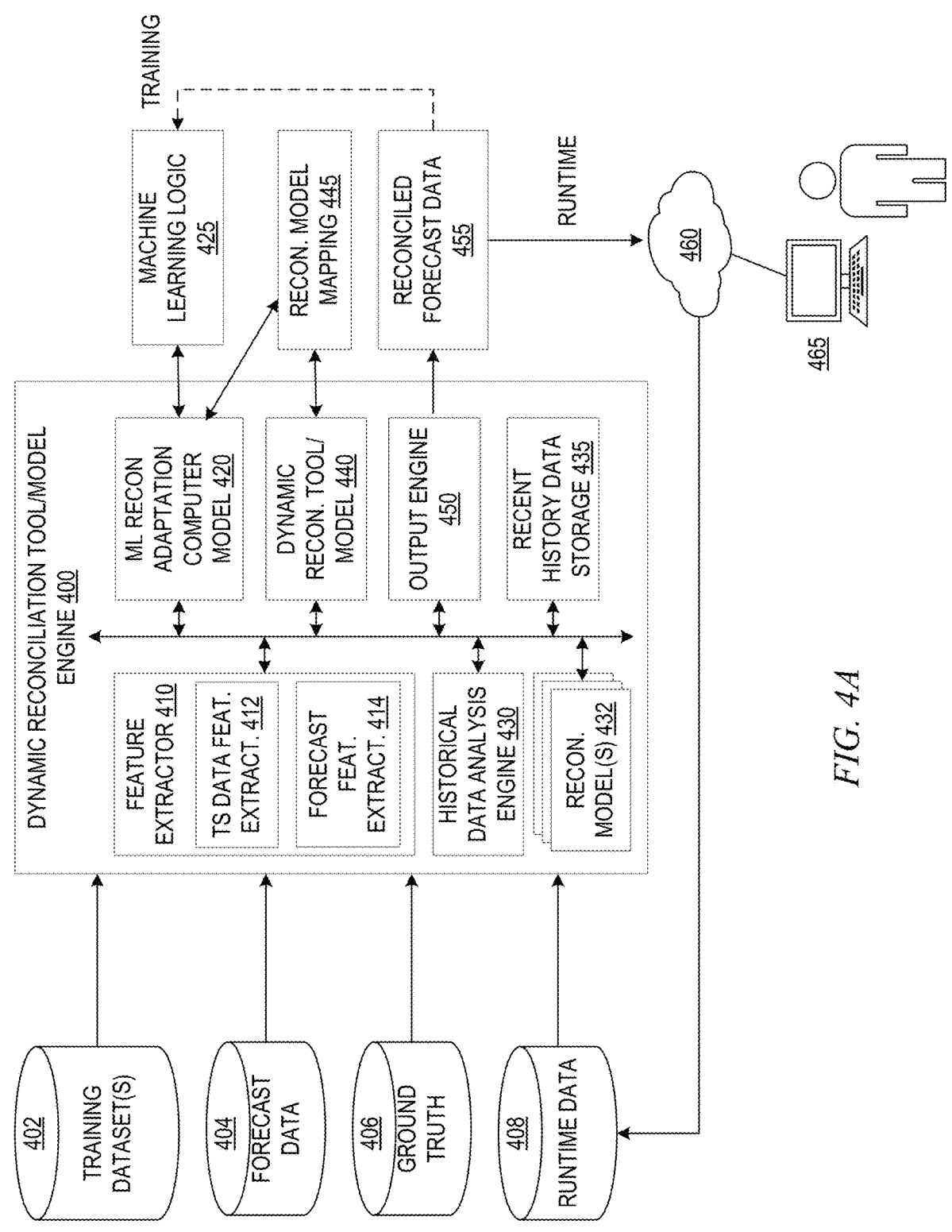
FIG. 4A is an example block diagram of the primary operational components of a reconciliation computing tool/model recommendation engine in accordance with some illustrative embodiments.

FIG. 4A is an example block diagram of the primary operational components of a reconciliation computing tool/model recommendation engine in accordance with some illustrative embodiments. It should be appreciated that the various elements shown in FIG. 4A are specifically implemented by specialized computing logic and/or data structures that specifically configure one or more data processing systems to provide the specialized computer functionality described herein. While FIG. 4A shows the primary operational components, it should be appreciated that additional components will be present as well, such as operating systems, libraries, application programming interfaces, storage controllers, and other software and/or hardware elements that facilitate the specialized functionality described herein.

As shown in FIG. 4A, the dynamic reconciliation computing tool/model engine 400 (hereafter, dynamic recon model engine 400) includes a feature extractor 410, a machine learning (ML) trained reconciliation adaptation computing tool/model 420 (hereafter, recon adaptation model 420), a historical data analysis engine 430, a dynamic reconciliation computing tool/model 440, and an output engine 450. In addition, a plurality of reconciliation computer tools/models (herein referred to generally as reconciliation models or recon models) 432 which may have fixed or static reconciliation matrices P or reconciliation functions, such that over time different reconciliation models 432 may be selected based on changes in datasets and corresponding forecasts. In some cases, the reconciliation matrices themselves may be dynamic over time, e.g., reconciliation matrices P(t). The ML reconciliation adaptation computer model 420 may be any suitable machine learning computer model that learns a correlation between patterns of features in hierarchical data and/or forecast data, such as patterns indicative of structural changes in the data, and optimum reconciliation models 432 to utilize to perform reconciliation of forecast data for time periods or groupings of forecast data.

The dynamic recon model engine 400 may operate on various data structures 402-408 during machine learning training of the recon adaptation model 420 and/or during runtime operation after the recon adaptation model 420 has been trained through machine learning processes. These data structures may include training hierarchical datasets 402, which may include historical data, training forecast data 404 which may include forecast data generated from corresponding training hierarchical datasets, ground truth data 406 which may specify correctly reconciled forecast data corresponding to the forecast data 404 and training hierarchical datasets 402, and runtime data 408 which is processed after the machine learning training is completed, i.e., during runtime operation. Moreover, the components 410-450 of the dynamic recon model engine 400 may further have sub-components for performing their functionality, e.g., feature extractor 410 may have a time series (TS) dataset feature extractor 412 that extracts features of a time series dataset, a forecast data feature extractor 414 that extracts features of a given forecast data, and the like. Moreover, these components may generate and store various data structures, such as reconciliation model mapping data structure 445, recent history data structures in the data storage 435, and reconciled forecast data 455, for example.

Other components and functionality that supports the functionality of the depicted components will be readily apparent to those of ordinary skill in the art in view of the present description. For example, machine learning methodology logic 425 may be provided for performing the machine learning training of the recon prediction computer model 420, where this machine learning methodology may include supervised or unsupervised machine learning. For example, a machine learning based on a loss formula and a linear regression, e.g., using stochastic gradient descent or the like, based evaluations may be utilized to minimize the loss by modifying operational parameters of the ML recon adaptation model 420 to reduce error in the reconciled forecast data with respect to the ground truth data until a satisfactory level of error is achieved or a predetermined number of machine learning training epochs, or iterations, have been performed. The particular loss function utilized and the particular logic for updating operational parameters of the model 420 will be implementation dependent and may take many different forms based on the desired implementation.

In general, the dynamic reconciliation tool/model engine 400, and the ML recon adaptation model 420, during a model training stage of operation, learns a correlation between structural changes in hierarchical datasets, corresponding forecast data, and reconciliation models 432 for reconciling the forecast data such that an optimum accuracy and coherency is maintained even in the presence of structural changes over time. During a runtime, or application, stage of operation, the dynamic reconciliation tool/model engine 400, and the trained ML recon adaptation model 420, analyzes the features of the runtime data 408 (which may include both the time series data for a time period and corresponding forecast data), and determines if a change in the reconciliation process is needed to adapt to the dynamic conditions represented in the runtime data 408, and then automatically and dynamically adapts the dynamic reconciliation tool/model 440 to the dynamic conditions based on the learned reconciliation model mapping 445, which may include selecting reconciliation models 432 to be implemented on the hierarchical forecast data by the dynamic reconciliation tool/model 440 and/or modifying parameters of a dynamic reconciliation matrix P(t) applied by the dynamic reconciliation tool/model 440. The dynamically adapted reconciliation tool/model 440 may then be applied to the runtime data 408 to generate reconciled forecast data 455 that may be returned to the provider computing system 465 that provided the runtime data 408, via one or more data networks 460, such as part of a decision support user interface or the like. It should be appreciated that the training of the ML reconciliation adaptation model 420, learning of the reconciliation model mapping 445, and application of the dynamic recognition tool/model 440 and/or reconciliation model mapping 445 may differ depending on the particular approach taken, e.g., the change point detection based approach, cluster based approach, stochastic process based approach, or deep learning approach.

During a machine learning training operation, the machine learning training is performed based on the training datasets 402, corresponding forecast data 404, and ground truth data 406. During a machine learning training operation, the feature extractor 410 extracts features of the training dataset 402, which may be a hierarchical dataset, such as a time series (TS) dataset, and may comprise multiple different hierarchical datasets, each of which are used as a basis for machine learning training. The feature extractor 410 further extracts features of the forecast data 404, which corresponds to training datasets 402. The training datasets 402 and corresponding forecast data 404 may be collectively referred to herein as historical data as this data may be previously encountered hierarchical datasets and corresponding forecast data generated by one or more forecast computer models, which have been determined to be sufficient for training purposes. The ground truth data 406 represents accurate reconciled forecast data that may be used to compare to generated reconciled forecast data, as described hereafter, to determine a loss or error which may be used to modify the operational parameters of the machine learning reconciliation adaptation computer model 420.

Thus, the feature extractor 410 may comprise a time series dataset feature extractor 412 and a forecast data feature extractor 414, for example, which perform these functions for feature extraction. These features are then used as a basis for performing historical data analysis by the historical data analysis engine 430 which works in conjunction with the ML reconciliation adaptation computer model 420 to determine a reconciliation model 432 to reconcile forecast data associated with an input hierarchical dataset, e.g., time series dataset. The historical data analysis engine 430 performs an analysis based on the particular approach or embodiment desired for the particular implementation to identify instances of structural changes in the input data 402-404 and/or 408, and provides this information to the ML reconciliation adaptation computer model 420 which determines a reconciliation model 432 to apply based on the identification of structural changes. This generates a reconciliation model mapping data structure 445 in some illustrative embodiments or otherwise is used by the dynamic reconciliation tool/model 440 to apply a dynamically adapted reconciliation model 432 to the forecast data 404 to generate reconciled forecast data 455. During training, this reconciled forecast data 455 is used by the machine learning logic 425 to determine a loss or error and, using a stochastic gradient descent or other machine learning training operation, modify operational parameters, e.g., hyperparameters, weights, or the like, of the ML reconciliation adaptation computer model 420 so to reduce the loss in the reconciliated forecast data in future iterations, until a convergence is reached, e.g., a loss/error is reduced to equal or below a given threshold, a predetermined number of epochs or iterations is performed, or the like.

For example, the feature extractor 412 may extract time series dataset features, such as seasonality and frequency features, domain/metadata features, noise across hierarchy features, noise across time features, trend/stationarity features, statistics of time series values in different time windows relative to the data time, and hierarchy characteristics features, for example. As an example, each data point in a time series dataset corresponds to a particular point in time. Seasonality features include values such as indicator values for which point in seasonal cycle the time series is in. For example, if the data is at an hourly resolution (time points for every hour) this could include a number of time series and calendar indicator values, such as the hour in the day (out of 24 hours), an indicator value for whether it is in the day or at night, and indicator for the day of the week, whether it is in the weekend or weekday, the month of the year, the season of the year, etc. It can also include encoding specific relevant events, such as indicator values for if there is a holiday or local event or not that might influence the time series (e.g., a promotion or sales event like "Black Friday" for retail demand), or an indicator of the proximity to these events (and such information also corresponds to domain-specific features). Seasonal or frequency features can also include measurements about the periodic nature of the observed time series, such as the autocorrelation coefficients for each time series across their history, or restricted to a recent time period (which is also refer to as a time window) relative to each time point, or similarly the Fourier transform components of the time series for such windows as well, which is a signal processing technique that characterizes the frequency spectrum of time series sequences.

Domain and metadata features include such features as are relevant for characterizing the time series and come from the particular application or physical characteristics of the time series themselves. For example, if the time series are sensor measurements of factory equipment, this could include information about the type of equipment and sensor corresponding to each time series, location information, etc. Noise and statistics across time, possibly for different time windows, and across the hierarchy, amounts to measuring different statistics across groups of observed time series values, such as the variance or standard deviation or other characterizations of the distribution of the values (noise) or other summary statistics like the mean, maximum, minimum, and median values. For example, for temporal features, one feature may be the mean value of a time series in the past week, another may be the maximum value in the past month, up to one week ago, etc. Similarly, for cross-hierarchy, one feature may be the variance of values for all time series with the same parent. Similarly features capturing properties of the hierarchy in addition to statistics of values across the hierarchy, can also be used, such as depth of the hierarchy, average number of branches, etc. Features related to characterizing time series properties, like trend and stationarity, can also be included, the former estimating the trend of the time series in terms of the rate of change of the values as a function of time, which could for example be estimated by fitting a linear regression to the values over time in a recent time window for a time series, or an indicator for if the time series is stationary (i.e., the distribution of values does not change over time) or not, for which statistical tests exist.

The feature extractor 414 may extract forecast data properties, such as the same type of features as computed for the time series but applied to the forecast over time, as the forecasts also comprise time series (i.e., the forecast at each time points). This can include the same sort of features, such as the mean and standard deviation of each forecast for a given time series in some specified time window relative to the current point. This also includes some additional features unique to the forecast time series, such as statistics of the forecast values for future time widows relative to a time point, and statistics and measurements of the forecast errors in different time periods. For example, a feature could be the mean squared error of a forecast for a time series in the past week which is obtained by measuring the difference between the forecast and the ground truth time series values for each time point in the past week relative to a given time point and taking the mean of the square of these values. Another feature could be the average bias of the forecast in a past time window such is in the past few days or past month, where the bias is the difference between the forecast and the true values. These can also be extended across the hierarchy of time series in different ways, such as providing individual features for each time series, or summary statistics of features or aggregations across different hierarchy groups or the entire hierarchy (such as average error in the last week across all time series in the hierarchy). Similar features can also be computed and included for different reconciliation models applied to the data.

These features may be encoded, such as by generating vector representations of these features, that are input to the historical data analysis engine 430 and/or ML reconciliation adaptation computer model 420. The historical data analysis engine 430 analyzes these features in accordance with a selected approach or embodiment to identify features representing structural changes in the historical data, which may be represented by change points, clustering, or the like. For the various periods of the time periods between structural changes, a corresponding predicted reconciliation model 432 is determined by the ML recognition adaptation computer model 420 by fitting the reconciliation model(s) 432 to groups of historical data/time points or fitting the reconciliation model(s) 432 by evolving a state over time or state evolution function such that the reconciliation model fits observed data, as described in greater detail hereafter. For change point detection and cluster based approaches or embodiments, the grouping of historical data/time points is used to fit the reconciliation model(s) 432 to the groups. For stochastic process based or deep learning based approaches or embodiments, the reconciliation model(s) 432 are fit by using a state evolution function that is fit to the observed data.

In performing this fitting of the reconciliation model(s) 432 to the training datasets and forecast data, the ML reconciliation adaptation computer model 420 may predict, for each group of historical data and/or time points in the historical data, a corresponding reconciliation model 432 to be used to reconcile forecast data. The dynamical reconciliation tool/model 440 may then apply the predicted reconciliation model 432 to the forecast data corresponding to those time periods to generate reconciled forecast data 455. The reconciled forecast data 455 is analyzed by the machine learning logic 425 including a comparison to the corresponding ground truth data 406 for that time period to generate a loss or error in accordance with a loss formula. The machine learning logic 425 determines, based on the loss/error, an adjustment to operational parameters of the ML reconciliation adaptation computer model 420 to reduce the loss/error. This process is continued until the loss/error is below a given threshold, a predetermined number of iterations or epochs are executed, or other convergence criteria are satisfied. Once the model 420 reaches convergence, the resulting reconciliation models for the input features representing structural changes in hierarchical datasets and/or forecast data are identified and mapped to these input features in the reconciliation model mapping data structure 445.

In illustrative embodiments based on clustering approaches, the learned mapping of features to cluster or group membership is maintained so that, at runtime operation, for new data, similar features extracted from the new data may be used to determine which cluster/group they correspond to for the current time, and from that a look up of the corresponding reconciliation model may be performed for that group so as to apply to the forecast to reconcile them. For illustrative embodiments based on the change point approaches, a current reconciliation model is maintained that could change upon detection of a change point. For the other approaches, the mapping from features to reconciliation model essentially can be viewed as part of the reconciliation model itself, i.e., based on a model of the historical observations which are input, e.g., the last week of observations and features relative to a current time point, this is fed into the model, such as the neural net model, which outputs a reconciliation model or mapping, or can also directly output the reconciled forecasts, if these are passed in.

It should be appreciated that while FIG. 4A shows a single ML reconciliation adaptation computer model 420, there may in fact be multiple different models 420 that are each individually trained through a machine learning training process by the machine learning logic 425. For example, in some illustrative embodiments, a separate model 420 may be provided and trained for each forecast computer model. In this way, different models 420 may be trained to predict reconciliation models for different forecast computer models and structural changes in hierarchical datasets and corresponding forecasts. Thus, one or more recon models 420 are trained through machine learning training processes of the ML logic 425 that provide accurate predictions for dynamically adapting the reconciliation computer model 440 over time as structural changes are detected in runtime data 408.

During runtime operation, rather than using the historical data 402, 404 and the ground truth data 406, the dynamic reconciliation tool/model engine 400 operates on runtime data 408. The runtime data 408 may include the specific hierarchical, e.g., time series, dataset, or extracted features of the time series dataset, forecast data generated by a forecast computer model operating on the hierarchical dataset, such as may be executed at the end user computing system 465, and in some cases a specification of the particular forecast computer model being used by the particular end user computing system 465 so that an appropriate ML reconciliation adaptation computer model 420 may be selected in embodiments where there are multiple models 420 trained, each for a different forecast computer model. This information may be received from the end user computing system 465 via one or more wired/wireless data networks 460, with the operation of the dynamic reconciliation tool/model engine 400 being provided as a service to the end user.

The runtime data 408 may be processed via the feature extractor 410 which extracts features from the runtime data 408, similar to during the machine learning training discussed above, and these features, or encodings of these features, are input to historical data analysis engine 430 that performs appropriate analysis for the particular approach or embodiment, e.g., change point detection, clustering, stochastic process fitting, etc., to generate analysis results that are input to the trained ML reconciliation adaptation computer model 420 to determine an appropriate reconciliation model 432 to be applied to the runtime data to generate reconciled forecast data 455. In addition, the historical data analysis engine 430 may maintain a recent history data storage 435 for a time window in the past that can serve as a basis for performing such change point detection, clustering, stochastic process fitting, or deep learning, for example, in addition to the runtime data 408, as such determinations are performed of time. The resulting reconciled forecast data 455 may then be returned to the end user computing system 465.

Figure 4B:
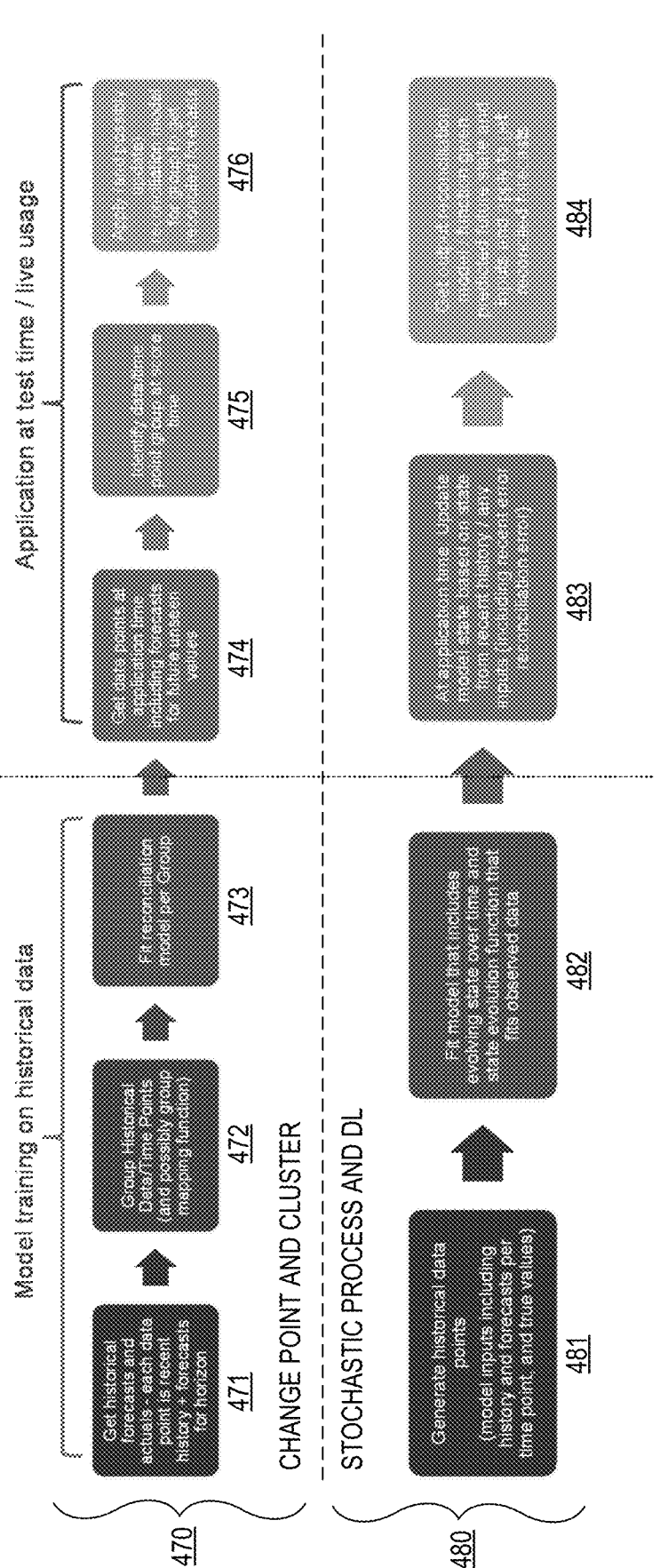
FIG. 4B is an example diagram demonstrating operational flows across training and runtime stages of operation, for four example approaches in accordance with one or more illustrative embodiments.

As noted above, there are multiple approaches to automatically and dynamically adapting the reconciliation model 432 to structural changes in hierarchical datasets and corresponding forecast data. FIG. 4B provides an overall high level flow diagram of four example approaches to performing such automatic and dynamic adaptation of reconciliation models 432 for application to hierarchical data and corresponding forecast data. Two of the four example approaches follow the flow 470 whereas the other two follow the flow 480, across the training 490 and runtime 495 stages of operation.

As shown in FIG. 4B, in accordance with a first process flow 470, in a first operation 471, historical hierarchical data and forecast data are obtained, and a dataset is generated in which each data point comprises a combination of the historical hierarchical data and the forecast data for the horizon. The historical hierarchical data may be considered ground truth data or "actual" data, i.e., values that are actually observed. Thus, historically, for each point in time, there may be forecast for values at that point in time based on data collected up to some previous time, as well as the actual time series values at that time, which were the values that were being predicted by the forecast. Thus, the historical hierarchical data may include both the previous forecasts and the actual observed data, such that the actual observed data may serve as a ground truth for machine learning training.

As a further explanation, as an example, a data point may comprise specific past and future information, possibly restricted to time windows, around the time point corresponding to that data point, along with the information in those time periods. For example, if there is a time series of sensor measurements every second for a pressure sensor, a data point may be defined for each second, and this data point may comprise historic information (any information that can be derived from knowledge or measurement values prior to, and including, that second, such as the pressure measured in each of the past 10 seconds and the average pressure in the past 30 seconds) and future information, i.e., information about future values relative to that point (second) in time, such as the next 10 sensor values which are to be predicted. In general, the forecast task involves predicting some horizon of future values, that is some specific number of future regularly spaced time points or values occurring in some fixed future interval of time. These future values are not present when applying the model at runtime operation, but are present in historical data from collected observations, and used to fit the models. In addition to the base time series in this case, the forecasts for the base time series are also available as additional values to include for each time point, including forecasts made at prior time points. This is important to note as with the mechanisms of the illustrative embodiments, the mechanisms derive reconciliation models that adjust these base forecast values. So in the same example, a given data point may consist of, for its historical values, pressure values in the last minute, along with prior time forecasts for those pressure values, and for its future values, future pressure values in the next 10 seconds, along with the forecasts for those values.

Features may be extracted from this combination of data and these features may be used as a basis for grouping in operation 472. This process can be thought of as windowing the time series to create a machine learning (ML) data point for each time point in the time series. That is, the first operation 471 takes a time series, which is a sequence of values over time, and transforms it into a dataset of examples of historical values and target values that the model is to predict. Each example is based on a specific time point in the time series.

In the second operation 472, the features extracted from the historical data/time points in the combined dataset are grouped, e.g., in accordance with change points and/or clusters as discussed hereafter with regard to the change point detection and cluster based approaches. In some cases, a group mapping function may be generated that maps a data point to a particular group. That is, a mapping function can be learned from features of the data point to the group or cluster membership, that is then applied at production operation run time as well. For example, based on the derived features, a machine learning model, or cluster model, is learned that can output cluster membership from the features, which may be derived directly from the grouping, clustering, or changepoint process, or may be derived as a secondary step after these groups are defined by such processes (for example, if change point detection is performed to split a time series history into different regions, which are then labeled via a clustering method, an additional mapping model can be learned to map data point features to these cluster labels). This mapping may also be able to indicate if a data point should not be mapped into any of the existing, historically created groups, or should instead be mapped into a new group.

In a third operation 473, the reconciliation model is fit to the particular group. That is, the model is fit using the set of data points/time points that fall within each group of data points/time points, which essentially correspond to different time periods. This fitting is done by executing the algorithm to set the reconciliation model parameters for a particular reconciliation method for the subset of data points included in each group. For example, this process may involve finding the parameters that minimize the reconciled forecast error for the group of data points in each group. In one illustrative embodiment, this "fitting" involves learning a different reconciliation matrix P for each period of time between change points. In another illustrative embodiment, this "fitting" involves learning a reconciliation matrix Pc or function for each cluster.

Put another way, this means that the set of data points (i.e., recall these are time points) are collected and classified/clustered. Those that are classified/clustered to be in the same group have a reconciliation model fit to that subset of data points, for each group. Rather than having a single model fit to all historic data, the illustrative embodiments may have multiple models fit to different subsets of the data that are similar or have the same time series structure. Additionally, the illustrative embodiments can optionally enforce that each group consists of only adjacent time points, or a minimal number of adjacent time points, before the group can change over time.

There can also be a relationship between the models fit across groups, such as similarity between models for groups that are adjacent in time. This is similar to the other illustrative embodiments, except that all the data is used to fit the models, so the group fitting is essentially done across groups, and there also may not be clear cut groups (i.e., there does not need to be an explicit grouping of the time points or data points).

The first, second, and third operations 473 operate to perform model training on the historical data during a training state 490 of operation. The historical data upon which this training is performed may be the data 402-404 in FIG. 4A and the training or "learning" to fit the model to the groups may be performed based on the ground truth data 406, such as by comparing reconciled forecast data 404, generated by reconciliation models on the training data 402, to reconciled forecast data specified in the ground truth 406, for a plurality of reconciliation models and determining a relatively best performing reconciliation model that the ML reconciliation adaptation model 420 should recommend or predict for the given training dataset 402 and/or forecast data 404 features. As noted above, this process involves obtaining the historical data 471, grouping the historical data 472, and fitting the reconciliation models to each group 473. In this way, the features of the historical data in each group are mapped to corresponding reconciliation models such that when runtime data is received, it too can be grouped and based on the grouping, a corresponding reconciliation model may be selected for application to the forecast data to obtain an optimum reconciled forecast data output.

Having learned associations between groupings of historical data and reconciliation models, the dynamic reconciliation tool/model engine 400 may be deployed for runtime operation 495. With regard to the first flow 470, during runtime operation 495, data points are obtained which may include forecasts for future unseen data values in operation 474. The operation 474 may be performed similar to the operation 471 in that features of the input data may be extracted by a feature extractor, e.g., feature extractor 410 in FIG. 4A, and these features may be used as a basis for generating the grouping in operation 472.

The received data is classified into a corresponding group and a corresponding reconciliation model is identified based on the grouping in operation 475. That is, the groups learned during the model training 490 serve as a predetermined set of groups into which the newly received data during runtime operation 495 is classified. The groups are mapped to reconciliation models and thus, by classifying the new data into one of the predetermined groups, the corresponding reconciliation model is identified. This may utilize the mapping data structure 445 in FIG. 4A, for example.

The reconciliation model is then applied to the group to obtain the reconciled forecast data in operation 476. In addition, based on the features of the newly received data during runtime operation 495, the grouping features may be updated so as to update the learning of the groupings. This may involve adding the new data to the training data and re-performing the training operation 490. This may occur periodically, after a predetermined number of new data instances are added to the training data, or the like. In this way, the training may be dynamically updated such that the system continues to learn over time the best performing reconciliation models for features of hierarchical datasets and forecast data.

In a second flow 480, for stochastic process and deep learning based embodiments, during a training stage of operation 490, in a first operation 481, historical data points are generated which may include the hierarchical data and forecasts per time point, as well as the ground truth data, similar to operation 471 in flow 470. Then, in a second operation 482, the reconciliation model is fit to the historical data, which may include evolving the state of the reconciliation model over time and learning a state evolution function that fits the observed data. For example, the reconciliation model has an internal state that changes/evolves over time. That is, the reconciliation model's state is a function of time, and this state influences the output of the model, i.e., this state determines the reconciliation matrix P that is applied. Thus, the reconciliation matrix P changes over time, as opposed to the previous two embodiments where there are discrete time segments and they explicitly learn a different P for each segment/group.

In the stochastic process and deep learning-based embodiments, the reconciliation mapping P is itself a function that changes, not only according to the sequence of observed data points, but also over time. For example, one illustrative embodiment uses a recurrent neural network approach, in which the model has an internal state defined by a fixed-size numerical vector, initialized to an initial value, such as all zeros, that gets updated by a neural network operation for each data point input in a historical time window, to arrive at a state for a current time point. The reconciliation model for the current time point is then a function of this current state. Such models are fit across all the observed data as the time evolution aspect of the model is to be fit by adjusting the parameters of the model to reduce the error between observed values and the predicted values via a machine learning process. In other words, the model fitting defines the state vector update equation/function, that encodes how to update the state vector given an observation (an observed data point for a given time point), as well as the output equation/function, that encodes how to output the reconciliation matrix or mapping, or perform the reconciliation directly, given the current state, e.g., the current state may itself be the reconciliation matrix).

Thereafter, during a runtime operation 495, in operation 483, the model state is updated based on the state of the recent history and/or any new data input. That is, once state update and output functions are learned during the fitting phase, they are applied to a sequence of data points to derive the state for a current point in time as well as the corresponding reconciliation model for that state. For example, at run time for the dynamic reconciliation model, its state vector is set to an initial state that was either learned as part of the fitting phase, or is a constant, such as all zeros. This state vector is then evolved by applying updates for each historical time point up to the current time point to get the current state, where the term "evolve" means to apply the learned update function where the state vector is updated based on the observations (data points) at the current time point, and this is done for the sequence of historical time points. This can either be done from the beginning of the time series itself, or starting from some fixed past time window of data points.

In a next operation 484, an output of the dynamic time-varying reconciliation model is generated from its current state (and possibly the current data point), which defines the reconciliation mapping which is then applied to the forecast data to thereby reconcile the forecast data. Note that in some embodiments, the output is simply the state itself (i.e., the output mapping is the identity mapping) as the state represents the current reconciliation matrix or mapping, whereas in other embodiments this may be a complex function of the current state, for example defined by a neural network. The model fitting defines this update equation/function, that encodes how to update the state given an observation, as well as the output equation/function, that encodes how to output the reconciliation matrix or mapping, or perform the reconciliation directly, given the current state (e.g., the current state may itself be the reconciliation matrix).

As mentioned above, the first flow 470 may be followed as part of a change point based or clustering based approaches or embodiments for determining optimum reconciliation models for application to forecast data. Each of these specific embodiments will now be described in greater detail with continued reference to FIGS. 4A and 4B.

Change Point Based Approach

With reference again to FIGS. 4A and 4B, with a change point based embodiment, deep learning or statistical change point detection is applied to identify change points in the input data, e.g., historical data during training, where this change point detection may be performed, for example, by the historical data analysis engine 430. This change point detection may be performed based not only on the hierarchical dataset, e.g., the training dataset 402, but also on the forecasts 404, forecast errors, and reconciliation errors. These are derived as described previously, as different features for each time point/data point, a forecast model is fit to the historical time series data (re-fit periodically across the historical data) and the forecasts are recorded at each time point. From these, the illustrative embodiments can derive the forecasts and forecast errors at each time point. This can also be done for the reconciliation method used, e.g., for the ERM method as applied to all historical data up to that point. In this way the illustrative embodiments can also get reconciled historical forecasts for each point, as well as those errors. When the reconciled forecast error starts to grow beyond a predetermined threshold specifying what is an expected or acceptable forecast error, detecting such an occurrence indicates a change point and the need for a different reconciliation method.

In addition, domain knowledge may be used to set change points as well, e.g., in a retail based setting, if domain knowledge indicates a particular time period for a promotion, the boundaries of the promotion time period may be used to set change points. This domain knowledge may be specified in one or more domain knowledge data structures (not shown) of the historical data analysis engine 430, for example. The historical data analysis engine 430 may also analyze changing hierarchy structure of the hierarchical datasets, e.g., time series datasets, represented by matrix S (see FIGS. 2A-2C). This may again be based on domain knowledge as a subject matter expert (SME) may provide the hierarchy data that specifies the relationship among the time series, as well as the time series data, and will change this when it changes. The illustrative embodiments may operate to automatically detect if the hierarchy and set of time series is different from what was previously present in the past, and consider this as a change point. This can happen in different contexts when time series are added or removed from the system. For example, in a retail setting, different time series correspond to different product sales at different locations. However, retailers discontinue products, i.e., they stop selling them at certain locations, or altogether across all locations, and they also introduce new products over time. Additionally, they introduce new product categories that can represent a change in the hierarchy, e.g., they might group the products differently for different reasons, such as starting to group products by brands instead of across brands. Similar changes can happen in other domains. For instance, in manufacturing, new devices can be added or removed in the process that provides different measurements over time, and new sensors could be added/removed. These changes may be represented in the domain knowledge structures that are utilized by the historical data analysis engine 430.

Having identified change points in the input data, e.g., historical data comprising training dataset(s) 402, forecast data 404, and ground truth data 406, through operations 471-472, the machine learning reconciliation adaptation computer model 420, in operation 473, learns a reconciliation matrix P, i.e., identifies a reconciliation model, for each period of time between change points, optionally with cross-period regularization. By cross-period regularization what is meant is that a technique is used to encourage the reconciliation matrices in nearby periods to be similar. This helps offset the case of too few time points (data points) per time period, as if there are fewer time points in a time period it may be hard to fit a good reconciliation model for that period (it would tend to overfit and not generalize well). In that case it is better to incorporate data from other periods as well in some way to help bias the solution (reconciliation matrix) found for the given period to be more reasonable (while still fitting the current period well). This can be achieved in a number of ways, such as via the loss function. The reconciliation matrices can be fit for all periods by solving an optimization problem across all periods in which the illustrative embodiments find the matrices that minimize the reconciled forecast error in each period while also minimizing the deviation in reconciliation matrices in adjacent time periods (weighted by a discount factor). In other words, the loss function is the sum of the reconciled forecast errors across all periods as well as the sum of the mean squared difference in reconciliation matrix entries in each pair of adjacent (in time period) reconciliation matrices weighted by a tunable hyperparameter lambda (for example, this term can have less weight and less importance than the reconciled forecast error term).

Alternatively as mentioned hereafter, this can also be done by fitting the reconciliation matrix for each period independently but using data from the other periods as well to do the fitting (compute the loss function), but just down-weight those periods the farther away in time they are from the given time period. In this way, all the data is still used to fit the reconciliation matrix for each period, but the data in the same period is given higher weight so the solution prioritizes minimizing the error in that period first and foremost. In this way, it will have low error in each period, but the solution will also perform well in other periods if possible (without having to sacrifice too much accuracy in the current period) which would make each reconciliation matrix more generalizable and more reasonable (address the case of too little data in each period).

Thus, the learning of the different reconciliation matrices P can factor in data from previous time periods in the hierarchical data, e.g., time series dataset, to fit the reconciliation matrix P. Methods such as ERM or MinT may be used, with smaller weight given to previous time periods, may be used to fit the reconciliation matrix based on previous time periods. This may be utilized in situations where little data is provided in the current period so far and additional data is needed to perform a sufficient fitting of the reconciliation matrix P. This is especially the case when the nature of the time series changes slowly over time. The weighting of the previous time periods can also be tuned with the training data, e.g., fitting an exponential decaying weighting with factor alpha, where alphas can be optimally tuned to the training data. Alternatively, as discussed above, a weighted average of the previous reconciliation matrices P for previous time periods may be used with a fitted decay, as opposed to fitting using decayed data.

In learning the different reconciliation matrices P for the various time periods between change points, in some embodiments, a bias/shrink reconciliation matrix may be used towards overall P learned on training periods for stability and robustness. This is essentially biasing the matrix that is learned for each time period to be similar to the reconciliation matrix fitted across all periods. To do this, the illustrative embodiments first fit a reconciliation matrix across all time periods (data), which is referred to as the global reconciliation matrix. The illustrative embodiments then fit a local reconciliation matrix per time period, but to fit it for a given time period the illustrative embodiments minimize the sum of the reconciled forecast error in that time period and the mean squared difference between the local reconciliation matrix for that time period and the global reconciliation matrix previously found, weighted by a discount factor. For example, the illustrative embodiments may weight the discrepancy with the global reconciliation matrix by a weight value, e.g., 0.1, in the loss function so it does not have as much influence on the local reconciliation matrix for that time period, and the global reconciliation matrix previously found may be weighted by a discount factor.

For example, one possible realization, i.e., fitting to exponentially weighted data from previous time periods, may be solving the following optimization problem, where there are n time periods identified via change point detection, and the reconciliation matrices P and decay factor alpha use a minimum of m time periods:

$$\underset{\alpha, P_i \forall i}{\mathrm{argmin}} \sum_{i=m}^{n} \sum_{j=1}^{i} \alpha(1-\alpha)^{i-j} \left\| Y_j - \hat{Y}_j P_i^T S^T \right\|_{\ell_2}$$

This is an example for the first regularization example approach given above with the usage of an exponential decay weighting "fitting an exponential decaying weighting with factor alpha" (note alpha is between 0 and 1). The reconciliation matrix for period i is $P_i$, the forecasts are Y-hat$_i$ and the ground truth time series values are $Y_i$. These are the set of values in the given period i, and there are n sequential periods here. Note each period could have a different number of time points, so matrices $Y_i$ and Y-hat$_i$ could have different numbers of rows for each i. Each row is a time point in the time period and each column is a time series. Alpha controls how quickly weights decay for periods farther away from the current time period. Each time period reconciliation matrix $P_i$ is found by minimizing this loss and solving this optimization problem. As one can see, by design the error of the reconciled forecast (given by the L2 norm of the difference in the ground truth matrix and the reconciled forecast matrix) has the most weight for a given $P_i$ for the time points in the same period i (when i=j) in which case the weight equals alpha. For time periods in the past, $j<i$, the weight is alpha*(1−alpha)^k where k is greater than 0, which will be a value less than alpha, and smaller with bigger j values.

This means that $P_i$ is still influenced by data in other periods and is still effective at reconciling forecasts in other periods, but this is not weighted as heavily in the loss as reconciling forecasts in the current period. This has the effect as described previously of resulting in a solution for each period that results in a low-error reconciliation for that time period, while still being good at reconciling other time periods as well. This biases or regularizes the reconciliation matrices for each period, since among reconciliation matrices that perform well for a given time period, the illustrative embodiments further select one that also could work well for other time periods also, thereby having a better chance of generalizing and avoiding overfitting to just the current time period.

During runtime operation 495, the operation starts with the current reconciliation matrix P, where the current reconciliation matrix P is the matrix determined based on the previously detected change point in the runtime data, and performs a reconciliation of the forecast data for the current time period. This is done until a next change point in the runtime data is detected, such as by the historical data analysis engine 430 which is now applied to the features extracted by the feature extractor 410 to identify change points in the runtime data as part of operation 474. In response to detecting a next change point in the runtime data, the reconciliation model is updated, such as via operations 475-476 in FIG. 4B, where this update leverages the previous time period information and corresponding reconciliation matrices P for determining the updated reconciliation matrix P, thereby leveraging more and more data as new runtime data comes in. This process may, in some cases, involve performing a prediction of the reconciliation model to apply based on the reconciliation model mapping data structure 445 learned through the machine learning process. In this way, the reconciliation model used for time periods of the hierarchical datasets may be adapted as changes in the time series and forecast data happen, thereby improving or maintaining accuracy of the reconciliation of forecast data.

Cluster Based Approach

In a cluster based approach, using the flow 470 of FIG. 4B and the mechanisms shown in FIG. 4A, historical patterns in the hierarchical dataset, e.g., time series dataset, are detected and used to select the most suitable reconciliation matrix P, or function, for each type of common time points. The historical patterns that are detected may correspond to, for example, promotion periods, different seasons, other periodic or predetermined time periods of change in hierarchical datasets, and the like, where these patterns may not be fully accounted for by the forecasts, or even if they are accounted for, may still need different reconciliation to obtain the best results with the changing forecasts. Moreover, with the clustering approach, time periods (or "regions") that do not match historical patterns may be identified and used to provide their own cluster corresponding to an "unknown" historical pattern case.

With the clustering based approach, historical data is obtained as part of the operation 471, and a time series clustering is applied to the obtained historical data, e.g., training datasets 402, forecast data 404, and ground truth data 406, as part of the operation 472. This time series clustering may include, for example, a deep learning based time series representation learning followed by a clustering algorithm which may utilize clustering functions, such as distance-based clustering functions and a k-means algorithm on the representations, such that distance can be used to identify which cluster a point belongs to based on features extracted from the historical data, e.g., identifying which cluster center is closest to the data points' representation in the representation space. The time series representation that is learned can be the vector of derived features for each time point/data point previously described. In this case, the time series representation forms a vector and the illustrative embodiments can perform k-means or other clustering on it. However, to capture some more complex or non-linear clustering, the illustrative embodiments can use other representation learning machine learning methods to map these initial feature vectors to a smaller dimension referred to as the representation space through a dimensionality reduction operation, such as a PCA or kernel PCA operation, to get lower dimensional vector representations of the original data and then apply k-means to this.

Neural network based representation learning may also be utilized. For example, the illustrative embodiments may use an autoencoder that maps the input vectors to a lower dimensional space. This mapping is learned by simultaneously fitting an encoder that maps the input data to the lower dimensional representation space, and a decoder, that maps the representation vector in the representation space back to the input space, which is fit by minimizing the reconstruction loss. That is, the difference between the input vectors and the reconstructed vectors (output of the autoencoder) is minimized. The illustrative embodiments can then use just the encoder to transform each feature vector to a representation in this lower dimension space.

The idea behind using these time series representations is that they can capture key characteristics of the data that may be a complex function of a number of the input features. In some sense, these can be viewed as corresponding to higher-level features, that may be more suitable for clustering/determining similarity of different data points. For example, a function of a time series features may identify the type of operating regime for a time series (e.g., if a device is in low power mode or not) and this may be captured by the representation which is then used to determine if two sets of time points are similar or not. Another example is in images or video (time series of images). The raw features are individual pixels, which is not useful to tell if two time points (images or scenes) are semantically similar. However, the illustrative embodiments can apply neural network representation learning to derive higher-level features that may correspond to things like detected objects in the image or scene layouts/situations/actions which are more useful for determining if different time points/images are similar.

In some illustrative embodiments, the time series clustering may include learning a function to classify time points in the historical data and/or the representation of the time point in the historical data, into a predefined group or cluster, with a probability value be generated for classification into each of the predefined groups or clusters. Thus, a highest probability value may be used to associate the time point with the corresponding group/cluster. In such a case, if none of the probability values meet or exceed a minimum threshold probability, the time point may be used as a basis for defining a new group/cluster and the time point assigned to this new group/cluster which then becomes a predetermined group/cluster for subsequent time points. In some illustrative embodiments, the time series clustering can also include a temporal regularization in the clustering objective to encourage nearby time points to be in the same cluster.

It should be appreciated that these features of the time series clustering can be implemented for each time point in a prediction horizon, so this clustering can be performed based on known features of future time points and the recent history time points, as may be maintained in the recent history data storage 435. It should be appreciated that the prediction horizon is the sequence length of future values being predicted by the forecasting. That is, for many applications one needs to predict more than just the immediate next value, and also needs to predict several future values. For example, in supply chain demand forecasting, one may want to predict the daily demand for each day in the next 14 days, such that the prediction horizon is 14.

In this approach, to apply an appropriate model for future time points the illustrative embodiments can ensure the cluster mapping model is based only on data that the cluster mapping model already has, which includes historical data (such as time series values that do not include future values, e.g., the time series values occurring for the prediction horizon in the past), and other features that are known in advance. For example, if the illustrative embodiments are forecasting for the next 7 days, and it is known what the day of the week for each of those days is, even though they are in the future, this can be a key and useful feature for clustering these time points (e.g., the cluster could even be based on which day it is). Similarly forecasting can be done for other time periods and seasonal features, such as hour in the day, season of the year, or the like.

Additionally, in many use cases/applications information for future time points is known, such as what events will occur, or operating states for different locations (such as of a factory, manufacturing center, warehouse or store). For example, in the retail setting, the price each product will be sold may be determined for the next two weeks, and when different promotions and discounts will be offered may be known. Similarly, device maintenance, closures, staffing, holidays, different global and local events, etc. can be known in advance and provide useful features for future time points. In general, these are supplied as calendar data that can be transformed into features for each time point. In order to apply this knowledge for future unobserved time points, the features used for those future time points need only be made available at the time the illustrative embodiments need to reconcile those future value forecasts (which is up to a prediction horizon before that future time point).

Having identified cluster membership for each of the time points in the input dataset(s), e.g., training dataset(s) 402, forecast data 404, and ground truth 406 during training operation 490, a reconciliation matrix $P_c$, or function, is learned for each cluster c. While this may be a separate operation performed after the clustering operation is performed, in some illustrative embodiments, this fitting of the reconciliation matrix $P_c$ may be performed substantially simultaneously with the clustering operation itself by including a reconciliation loss in the clustering objective. A regularization may be used as with the change point approach discussed above, with smaller weight for data points that are further clusters when fitting $P_c$.

That is, clustering data points may be accomplished by minimizing a loss function, such as learning a cluster mapping function that minimizes a cluster error metric (like silhouette score). Another term may be incorporated into this loss function that corresponds to the mean reconciled forecast error in illustrative embodiments that apply a reconciliation model for each of the clusters in the current assignment. Thus, the illustrative embodiments may optimize over the cluster assignments as well as the reconciliation matrices per cluster (note again: the terms in the loss function can have different weights that can be tuned).

For example, assume that there is a fixed number of clusters as a tunable hyperparameter. An assignment vector may be defined for each cluster that indicates if each data point is in that cluster with constraints that no data point is in more than one cluster. In addition, a reconciliation matrix is defined for each cluster. These assignment vectors and reconciliation matrices are the parameters/variables of the reconciliation model and optimization problem. The illustrative embodiments then find the parameters (matrices and assignments) that minimize the loss function which is a function of these assignments and reconciliation matrices measuring how well the assignment clusters the data according to the features, and how well the reconciliation matrices per cluster minimize the reconciled forecast error. By optimizing over the combined loss, the illustrative embodiments can use the reconciliation effectiveness to influence the clustering, and find clusters that not only result in having data points with similar features, but also are found to be effective for reconciliation.

Based on the clustering to generate a set of clusters, and the learned reconciliation matrix $P_c$ or function for each cluster, which may be stored in a reconciliation model mapping data structure 445 for example, at runtime operation 495 data points in the runtime data are processed to extract corresponding features by the feature extractor 410 and these features are used by the historical data analysis engine 430 or other clustering mechanism that assigns the data points to the most similar/probable clusters. The corresponding reconciliation method for that cluster is retrieved from the learning, e.g., from the reconciliation model mapping data structure 445, and applied to the runtime data points of that cluster. This clustering of runtime data points to the predetermined clusters may make use of a soft clustering/mixture modeling, e.g., the probability of cluster membership can be used as a weighting for a reconciliation matrix for a particular data point.

This may be done for each data point that is received, as each data point could have different probability of belonging to each cluster. There are many techniques to get probabilistic cluster membership/soft clustering with one example approach being to use a probabilistic extension of K-means: gaussian mixture models. By fitting a gaussian mixture model, the illustrative embodiments obtain the probability of a data point belonging to each cluster based on a Gaussian distribution function of the distance between the data point and each cluster center. This approach results in a mean and variance for each cluster center (as opposed to just position=mean as in k-means) and this corresponds to the mean and variance of the Gaussian distribution, which when a data point is input, gives the probability of cluster membership (which may be normalized across all clusters). When the weights per cluster are obtained, the illustrative embodiments can, for example, take a weighted average of the reconciliation matrices per cluster using these weights and then use this new weighted average reconciliation matrix to perform the reconciliation. For example, if a data point is given the probability of cluster membership for cluster A of 0.6 and cluster B of 0.4, the illustrative embodiments can compute the reconciliation matrix for the data point as $0.6*P_A+0.4*P_B$, where $P_A$ is the reconciliation matrix for cluster A, and $P_B$ for cluster B.

In addition, techniques can be used to identify if a new point belongs to an existing cluster or a new cluster needs to be generated, as mentioned above. In the case of a new cluster needing to be generated, the cluster may be generated and the clustering operation, i.e., a retraining, may be performed again, and a similar operation can be used to estimate the reconciliation model appropriate for the new cluster. This may be accomplished, similar to the change point approach, when there is limited new data available, for example. To determine when a new cluster needs to be generated, a distance threshold may be specified that is used to determine if a data point is too far aware from any cluster center to cluster that data point into an existing cluster, in which case a new cluster needs to be generated. In some embodiments, if the cluster probability prediction mechanism is used, if the probability is not high enough, as defined by a predetermined threshold probability, to cause the data point to be clustered into an existing cluster, then a new cluster may be generated and the clustering and reconciliation model association learning can be performed with regard to the new cluster.

As an example, consider a time series dataset of sensor/device measurements for operating machinery, medical devices, or manufacturing devices. This could correspond to the devices operating in different regimes or settings. such as may be operating in different power modes, temperatures. or under different settings corresponding to different operations or operating conditions. There may have been several regimes observed in the past that correspond to different clusters, but a new regime corresponding to a new operating condition or usage may occur that was not observed before. For example, operating in a different temperature, or under different amount of load or power availability, etc. This would result in different time series dataset characteristics and features which could correspond to a new cluster.

Similarly in the demand forecasting case, a new promotion/promotional period may be introduced. For example, there may be learned clusters for regular holiday promotion periods like Mother's Day and Thanksgiving (Black Friday) periods, but the company may introduce, at some point, a new promotional period around another time (such as Fourth of July) leading to a new cluster. As another example, a new local event, such as a new parade or sporting event popularized in a specific area, may result in new purchasing behavior that could correspond to a new cluster. Many different conditions and occurrences may be cause for the creation of new clusters as is evident from the features of the time series datasets.

As mentioned above, the second flow 480 may be followed as part of a stochastic process based or deep learning based approach or embodiment for determining optimum reconciliation models for application to forecast data. Each of these specific embodiments will now be described in greater detail with continued reference to FIGS. 4A and 4B.

Stochastic Process Based Approach

With the stochastic process based approach to dynamic adaptation of reconciliation models to structural changes in hierarchical datasets, the reconciliation matrix P is dynamic and changes over time following a stochastic process. That is, instead of the static reconciliation model given by a static reconciliation matrix P that applies to all time points and corresponding data, the stochastic process based approach provides a reconciliation matrix P(t) that varies over time. This reconciliation matrix P(t) can be defined in one of several different ways, such as by defining a stochastic process or a state-space-based time series model for the elements of P(t) and fit the model to the observed data using reconciled forecast error as the loss. This dynamic reconciliation model approach provides, for any time point, the reconciliation mapping/matrix for that time point. That is, the dynamic reconciliation model provide the relationship for describing how the reconciliation model is derived for each time point in terms of how it evolves over time, e.g., describing how P(t) is derived from P(t−1) and possibly any observed data at time t. This may be one model that is fitted at training time, and then applied at test time and runtime.

Reconciled forecast error may be the driving loss of the dynamic reconciliation model, as the dynamic reconciliation model is applied across time points to get reconciled forecasts for each time point using that the dynamic reconciliation model. That is, the reconciliation matrix P(t) at each time point under the model with its current parameters is determined so that the reconciled forecast error can be calculated for given parameters of the dynamic reconciliation model, and then optimize these parameters to find the parameters that minimize this reconciled forecast error over the historical data. For example, the dynamic reconciliation model may consist of learning an initial P(0) reconciliation matrix, as well as exponential decay parameter alpha for defining how to weight previous reconciliation matrices to get the new reconciliation matrix. For example, in one illustrative embodiment, the reconciliation matrix P(t) may be defined as P(t)=sum$_i$ alpha(1−alpha)^i P(t−1), i.e., the reconciliation matrix P(t) at time t is given as a weighted sum of the past time point reconciliation matrices, including an initial starting reconciliation matrix P(0) which is also part of the model and fit to the data. Note that this model is applied sequentially to get each reconciliation matrix starting from t=1, and the exponential decay weighting factor alpha and initial reconciliation matrix P(0) are selected to minimize the historical reconciled forecast errors under this model. This is just one example of a state-based stochastic model for the reconciliation matrix, and the illustrative embodiments are not limited to such.

Thus, after having obtained the historical data in operation 481, each element of the reconciliation matrix P(t) evolves independent according to a slowly evolving first order Markov process, or other time series model, e.g., state based model. This can also be applied as temporal regularization for fitting P(t) directly for each time point in the hierarchical dataset, where P(t) can be more flexibly fit per time point, but strongly regularized to be predictable from past values. This temporal model can be used to derive the estimate for the future time point reconciliation matrices based on the last fitted P(t) model, i.e., the temporal model, e.g., 420, describes how the reconciliation matrices P(t) evolve over time, e.g., how to derive P(t) given observed data For example, one realization of this temporal model, e.g., ML recon adaptation computer model 420, may be an auto-regressive temporal model where future P(t) is predicted as a linear combination of prior P(s) for s<t. With this example implementation, the following equation may be fit, i.e., fitting the parameters of the model to the observed data via an optimization problem, to get P for each time point, where P(t) and the weights of the linear model are used to derive future P(t):

$$\underset{P_t \forall t; w_i, i=1,\dots k}{\text{argmax}} \frac{1}{nN} \sum_{t=1}^{N} \left\| Y_t - SP_t \hat{Y}_t \right\|_{\ell_2} +$$

$$\frac{\lambda_1}{n^2(N-k)} \sum_{t=k+1}^{N} \left\| P_t - \sum_{i=1}^{k} w_i P_{t-i} \right\|_{\ell_2} + \frac{\lambda_2}{k} \sum_{i=1}^{k} w_i^2$$

where $P_t$ is the reconciliation matrix at time t, $Y_t$ is the vector of time series values for all time series at time t, Y-hat is the vector of forecasts for all time series at time t, N is the number of time points in the historic data (time points are ordered from 1 to N), n is the number of time series in the hierarchy, k is a hyperparameter specifying how many past time points to use for predicting how $P_t$ evolves as a linear combination (e.g., weighted average) of the prior k P matrices ($P_{\{t-1\}}$ through $P_{\{t-k\}}$), $w_i$ is the weight given to the ith past time point reconciliation matrix in this weighed average, and lambda$_1$ and lambda$_2$ are hyperparameters that control the strength of the regularization in the objective (how much these terms trade-off with the reconciled forecast error in the first term). Note the second two terms serve to regularize the $P_t$ to ensure smooth transition and relationship between $P_t$ matrices over time and that $P_t$ can be predicted for future time points as well from the historic ones (e.g., for t=N+1). Without these terms, a reconciliation matrix would be found for each time point independently, which could have no relationship to adjacent time points, would provide no information about how to derive the reconciliation matrix for a future time point, and would likely overfit to each current time point due to noise in the time series values and over parameterization. That is, the reconciliation matrix would have no error in reconciling the current time point but not really capturing the right ground truth pattern for how forecasts should be reconciled (as a single data point is used to find each matrix in that case which has many parameters, which from statistics is known to result in high variance and high expected error in the estimate of the parameters, i.e., the matrix).

By simultaneously finding matrices $P_t$ that enable low reconciled forecast error for each t, but also are predictable with a smooth function from prior time points t–1 through t–k, the illustrative embodiments ensure the matrices found are good for reconciliation but can also be explained by the totality of historical data, and also can be used to predict how the reconciliation matrices should evolve for future time points. Note, as a clarifying point, in this particular example dynamic model, the parameters of the model are reconciliation matrices for each historical time point, along with k weights that define an update equation for predicting a future reconciliation matrix given k past ones. These parameters are all found to minimize the above defined loss function, i.e., an optimization procedure is run to find parameters that give a good low loss value, which may be a local or global optimum of the loss function (objective value of the optimization problem). Different optimization techniques can be used to perform this optimization and some may involve using approximations of this formulation to reduce the computational complexity of the optimization, such as by reducing the number of free parameters per time point. Numerous optimization approaches exist by which the illustrative embodiments can find low-loss solutions to the optimization problems defined, and specific choices are implementation and application dependent, depending on cost-benefit trade-off analyses for the different approaches.

To get future P(t+1) for a current time t, the fitted P(t) from historical data, along with the learned weights $w_i$ are used: $P_{t+1}=\Sigma_{i=1}^{k}w_iP_{t+1-i}$. Once true values, e.g., during runtime, are observed for time t+1, updated P(t+1) may be derived by solving the optimization problem above with fixed $w_i$ and P(t) for past t. In practice, using a full dynamic model, the $w_i$ and the P(t) for historic time points need be periodically refit less frequently as new data is accumulated.

It should be appreciated that more complicated models may also be utilized, as will be apparent to those of ordinary skill in the art in view of the present description, with the above model only being used as one example implementation of the illustrative embodiment. For example, a Bayesian state-space model, such as Kalman filtering, may be utilized that enables estimating best values of P(t) given observed values and regularization prior for P. It should be noted that this regularization may be performed in various ways as well, such as modeling the P(t) reconciliation matrix as a combination of a full-rank $P_{static}$ and a time-evolving low-rank addition to the static matrix $P_{dynamic}(t)$, e.g., represented by learning 2 smaller dimension matrices that are time-evolving R(t) and V(t) such that $P_{dynamic}(t)=R(t)V(t)$ (their product) and $P(t)=P_{dynamic}(t)+P_{static}$.

For example, one realization of this amounts to replacing each P(t) in the above equation with $R(t)V(t)+P_{static}$, and optimizing the same objective function but here with parameters R(t), V(t), and $P_{static}$, rather than P(t) for all t. P(t) is of size n×m where n is the number of time series, and m is the number of lowest-hierarchy level (base) time series. Having to find P(t) for all t, i.e., treating them all as variables in the optimization problem, results in a very large number of variables if N (the number of time points) is large, specifically n*m*N parameters/variables (not including the weights $w_i$), that can be computationally expensive to solve. If instead, P(t) is defined as a sum of a single $P_{static}$ n×m matrix and the product R(t) V(t), where R(t) is n×d and V(t) is d×m, with d much less than n and m (e.g., d may be 4), then there are much fewer parameters/variables in the optimization problem (n*m+N*d*(m+n)). Again, the same setup, approach, formula, and optimization problem is used as previously described, the parameterization of the reconciliation matrices however are defined differently to reduce the computational complexity.

Having learned the dynamic reconciliation matrix model defining P(t) and its evolution, this model is applied to predict future reconciliation matrices for forecast data to perform reconciliation at runtime, as described above. Note also, that the example detailed approaches for simplicity only involved state/reconciliation matrix P(t) updates based on past state values, but such formulations can be extended to include the derived features at each time point previously described. That is, in the previous equation defining the loss function and optimization problem, instead of P(t) being a weighted sum of past P(t), it could also be a function of current features at time t, e.g., $P_{t+1}=\Sigma_{i=1}^{k}w_iP_{t+1-i}+h(\text{features}_t)$ where "features$_t$" is the vector of computed features at time t, and h is a function mapping this vector to a matrix of size n×m, such as a linear mapping (matrix) whose parameters are then include in the variables of the optimization problem.

Deep Learning Based Approach

The deep learning approach can be seen as an extension of the stochastic approach, where this deep learning approach uses neural networks (non-linear mapping functions) instead of just simple linear mappings, and also does not explicitly solve for a state for each time point with the optimization problem, but instead computes and stores the state as part of the neural network model. In a deep learning based approach or embodiment, instead of temporal, a dynamic reconciliation model being learned and applied that provides reconciliation matrices (model) P(t) per time point as well as a linear evolution function for the reconciliation matrices over time, which also serve as the state as in the stochastic process based approach above, a more flexible arbitrary function modeling approach is used for both the temporal model (state evolution) and reconciliation model (mapping of all forecasts to the base forecasts), using a deep learning neural network or other machine learning computer model. With the deep learning based approach, a deep learning temporal model, such as a recurrent state-based computer model, is fit to the historical data where this deep learning temporal model evolves over time based on the historical data and outputs a reconciliation matrix per time point or directly outputs the updated base forecasts or adjustments to these base forecasts. Direct outputting can be achieved by taking the input forecast data, e.g., forecast data 404, and temporal state as input, and outputting updated based level forecasts, e.g., with an autoencoder which can be regularized using reproduction loss along with reconciled forecast error such that it is regularized towards preserving the forecasts.

For example, a neural net model for this dynamic reconciliation consists of two sub-components or functions, and an internal state vector, initialized to a desired value, e.g., all zeros. These sub-components can also be neural networks that make up part of the overall neural network model, such that these sub-component neural networks may be referred to as sub neural networks. One sub-component is itself a neural network that maps the current state to the next state, based on observations at the current time, i.e., it predicts what the next state should be based on the current state and current observations. Specifically, the current state vector concatenated with time series values and any features at the current time point are fed in as the input to the neural network, and the output is a vector that is taken to be the updated state, i.e., the state for the next time point. The second sub component is the output function/mapping, which is also given by another mapping function, for example, another neural network. This takes as input the updated state vector, optionally concatenated with features for the time point being forecast, and outputs a reconciliation model (which can itself be a neural network or a reconciliation matrix). For example, this may be another neural network (i.e., that is part of this overall model) that takes as input the updated state vector and outputs an n×m reconciliation matrix P, which is then used for reconciliation for the current forecasts. Alternatively, it may be mapped to the weights and biases (i.e., the parameters) of another neural network model, instead of a linear matrix.

Figure 4C:
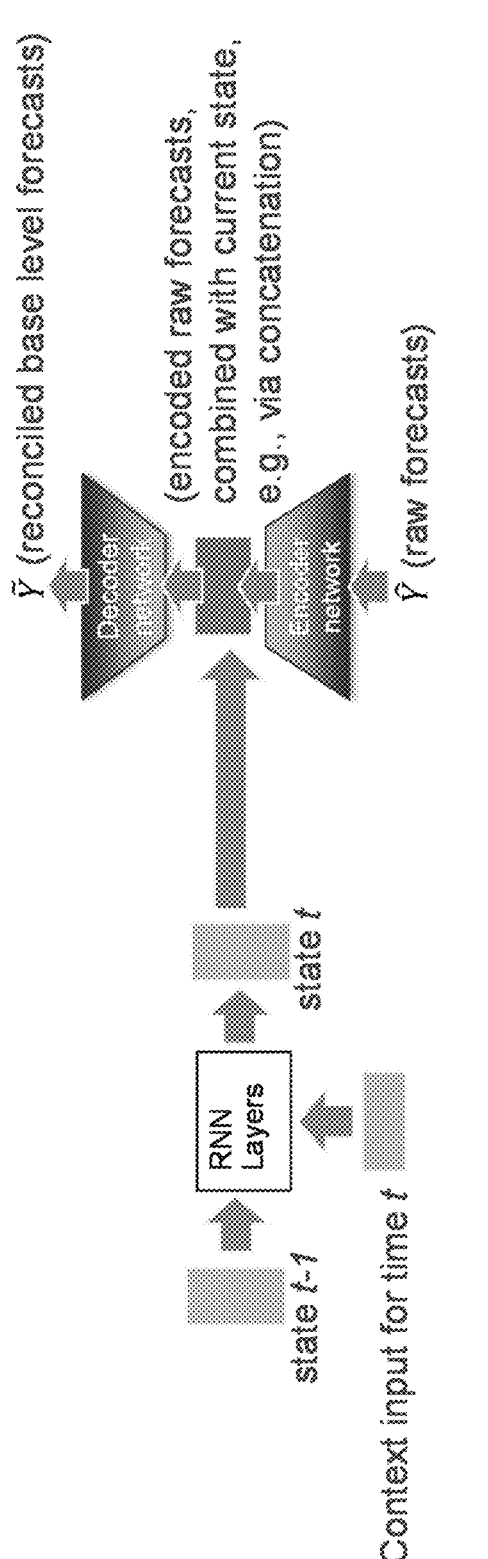
FIG. 4C shows an example of a deep learning neural network approach in accordance with one illustrative embodiment.

In some illustrative embodiments, the updated state may serve as input to another neural network model that replaces the reconciliation matrix for the current time, such as an auto-encoder. This approach with the auto encoder is illustrated in FIG. 4C, where the model first maps all of the original forecasts at a current time point to a low dimension vector (which is referred to as an encoder neural network or encoder), and then concatenates this vector with the updated state vector and passes them through another neural network (which is referred to as the decoder neural network or decoder) that maps these to the output updated base forecasts (forecasts at the lowest level of the hierarchy) which are then summed according to the summing matrix S to obtain the complete set of reconciled forecasts. In this way, the current updated state at each time point influences, and can change, the reconciliation function (the output of the autoencoder) because it changes the input to the decoder network. The autoencoder network can output different updated base forecasts for the same raw/original forecast inputs based on the additional current updated state vector input.

Note that in each of these possible illustrative embodiments, all of the weights and biases of these neural networks make up the model parameters and can be fit with a machine learning process. That is, an optimization problem is approximately solve using a machine learning algorithm that minimizes reconciled forecast error under this model averaged across the historical data, e.g., with stochastic gradient descent or the like. Note the above describes the evolution of the state from the initial state vector to the updated state vector, with the updated state vector then being used for the output mapping. In practice, multiple update steps (that arise from iterating over multiple past time points) are applied to update the state vector from its initial state, e.g., an initial state of all zeroes, before using the updated state for the output. This corresponds to taking a time window of data/time points before the current time point, and feeding each time point starting from the beginning, one by one into the neural network state update sub-network, to update the state vector (starting from the initial state vector of all zeros, for example), before arriving at the state vector for the current time point and using it to obtain the output. That is, rather than maintaining the state from all time points, a fixed size recent window of time points can be used to go from the starting state to a usable state representation that characterizes the current state of the time series based on the recent time window of observations, which can then be used to get the output. The size of this history time window is a hyperparameter that is tuned via a hyperparameter tuning technique, such as selecting from a set of candidate values which vale gives the best results on validation data (that is a subset of the data not used to optimize/fit the parameters of the neural net model).

Note, as pointed out in this example, in addition to past state data, observed time series values and forecasts, forecast errors, reconciliation errors, and additional features may also be utilized for generating the reconciled or updated forecasts. This may be achieved by computing these values (i.e., features) at each time point and concatenating the vector of these features to include as input to the different sub neural network components (examples of computing such features were provided previously). This enables the model to be adaptive, e.g., to switch to a different reconciliation function if the recent reconciliation error is undesirable, or switch the reconciliation function if a feature indicates a structural change in the hierarchical dataset, e.g., a new promotion is active. This is learned automatically by the ML recon adaptation computer model 420, such as by providing these as features (as previously described how these features are computed). The ML recon adaptation computer model 420 learns from historical data, if it should behave differently given specific input features, such as a feature indicating high recent reconciliation error, or that a new promotion is active, and can learn how it should adjust the reconciliation based on the current context. This is learned through the model fitting process, i.e., the optimization of the reconciliation model parameters to minimize loss on the historical data.

FIG. 4C shows an example of a deep learning neural network approach in accordance with one illustrative embodiment. The example shown in FIG. 4C is an example of a single recurrent layer implementation for state h and context input x, where the state is the state vector which is initialized to zeros, for example, at the beginning of an input time window (t=0) and transformed with the same neural network function for each time step and inputs at that time steps (as shown in FIG. 4C, the update via the neural network to transform the state at time t to an updated state for time t+1), and the context consists of all features or observed values, as previously descried at that time step. For example, the observed set of time series values and forecast values for the current time point, concatenated together as a vector, can make up the context vector input for the current time point, or more generally this can also include the complete set of features per data point computed for each data/time point, such as described and given examples of previously above (such as seasonality features, time window statistic features, etc.).

One example embodiment amounts to directly outputting a reconciliation matrix P at a given time point via a neural network mapping from the current state vector, and this can be described with the following pair of equations, the first being the state vector update equation and the second being the reconciliation matrix output equation, i.e., the output reconciliation matrix is a neural network function of the state h and a base (offset) $P_0$ matrix that is also learned as part of the model:

$$h_t = \sigma_h(W_h x_t + U_h h_{t-1} + b_h)$$

$$P_t = \text{reshape}(\sigma_y(W_y h_t + b_y)) + P_b$$

where $h_t$ is the state vector at time t, $W_h$ is the weight matrix that transforms the input context vector at time t, $x_t$, $U_h$ is the weight matrix that transforms the previous state vector $h_{\{t-1\}}$, $b_h$ is a bias term and sigma$_h$ is a nonlinear transformation such as a sigmoid function. This first expression describes the state update equation in which the current state is a sum of linear functions of the previous state, the current context, and some fixed bias, which is then passed through a nonlinear transformation to get the final output, the updated state (note some previous descriptions instead stated $x_t$ and $h_{\{t-1\}}$ were concatenated together instead, which is an alternative approach in which case $W_h$ is the only weight matrix needed and applied to the concatenated vector). The second expression defines the output mapping/equation. Here $W_y$ is a weight matrix and $b_y$ is a bias value that defines a linear mapping of the state at time t, $h_t$) and sigma$_y$ is again a nonlinear transformation such as a sigmoid function or the exponential function. Here the state vector $h_t$ is of some fixed dimension, r, and $W_h$ maps this to the same size as the reconciliation matrix, n*m, so $W_h$ is an n*m×r matrix. The output of this transformed linear mapping is an n*m length vector, so the reshape operation reshapes this vector into a matrix of the same shape as the reconciliation matrix P needs it to be (reorganizes it so each sequence of m entries forms each of the n rows of P). This reshaped output matrix is then added to a base reconciliation matrix $P_b$. In this way, the neural network part is learning a modification to a base reconciliation matrix for each time point. Note that when training this model, $P_b$ and weight matrices and biases are found via optimization (such as stochastic gradient descent) that approximately minimizes the reconciled forecast errors on the historical data when applying the model.

The deep learning model is fitted to minimize reconciled forecast error across observed data, along with temporal regularization, i.e., predictability of future states for future time point reconciliation functions, from the current state, to enforce the reconciliation function changes predictability over time. This is used to get the reconciliation matrix or function for future time points. This is done via the state vector update function as described above and enables predicting the state for each future time point based on the previous time states. Each updated state at those future time points is then mapped to a new reconciliation matrix or function for each future time point by the output function of the model.

One advantage of the deep learning based approach or embodiment is that context can be an input into the neural network as well and can be used to help determine how to do the reconciliation, beyond the forecast data and hierarchical data, e.g., time series dataset. For example, additional features and information can also be passed as input to the network, such as shown in FIG. 4C, and used during training to enable an improved output reconciliation function as a result that is adjusted for the given context. For example, a promotion or season feature may be one such context input and, based on historical data, the model can learn to output a different reconciliation matrix P if the promotion or season feature has one value versus another, e.g., if the promotion or season is active.

Thus, the mechanisms provide an automated computing tool for providing an adapted reconciliation computer tools/models with regard to features of a hierarchical dataset, e.g., a time series dataset, and a forecast computer model which operates on the hierarchical dataset. The mechanisms provide one or more specifically trained machine learning trained computer models to make such predictions which take into account the features of the time series dataset, the features of the forecast computer model, and the features of the reconciliation computer tools/models to determine the reconciliation model to use for a given time point.

FIGS. 5-9 present flowcharts outlining example operations of elements of the present invention with regard to one or more illustrative embodiments. It should be appreciated that the operations outlined in FIGS. 5-9 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-9, and may, in some cases, make use of the results generated as a consequence of the operations set forth in FIGS. 5-9, the operations in FIGS. 5-9 themselves are specifically performed by the improved computing tool in an automated manner.

FIG. 5 is a flowchart outlining an example overall operation for dynamically adapting a reconciliation model for generating reconciled forecast data in accordance with some illustrative embodiments. As shown in FIG. 5, the operation starts by computing data points consisting of features, such as current and past time series observations, statistics in time windows, seasonality indicators, etc., targets (true time series values for prediction horizon), and forecasts for each time point in input historic dataset (step 510). The output is a dataset of tuples (x, y, f) such as a tuples of (features, targets, and forecasts) for each time point.

A dynamic reconciliation model is fit to this historic dataset, i.e., the parameters of the dynamic reconciliation model are found that minimize the reconciled forecast error averaged across the historical data when the model is applied to do the reconciliation (step 520). This model is able to provide a reconciliation mapping function for any given time point. The output of this operation is a dynamic reconciliation model.

Then, for each production runtime point that occurs, the data point for the current time point is computed except for the (unknown) targets, i.e., features and forecasts. The reconciled forecasts are then computed from the dynamic reconciliation model for the current time point (step 530).

The current reconciliation model (output from step 520) is then updated with the new data as needed or specified, e.g., if enough steps have occurred, the dynamic reconciliation model is refit or updated, or some components of the reconciliation models are updated/fit as needed with the new data point (step 540). The output of this operation is an updated dynamic reconciliation model. If there are more runtime data points to process, the operation returns to step 530; otherwise the operation terminates.

FIG. 6 is a flowchart outlining an example operation for dynamically adapting a reconciliation model using a change point approach in accordance with one illustrative embodiment. As shown in FIG. 6, the operation starts by computing data points consisting of features, such as current and past time series observations, statistics in time windows, seasonality indicators, etc., targets (true time series values for prediction horizon), and forecasts for each time point in input historic dataset (step 610). The output is a dataset of tuples (x, y, f) such as a tuples of (features, targets, and forecasts) for each time point.

Change points are determined to define distinct periods and a reconciliation model/matrix P is fit per period via solving an optimization problem with a specific loss function (step 620). The output of this operation is a current reconciliation matrix, change point predictor method, and optionally a set of past reconciliation matrices.

Then, for each production runtime point that occurs, the data point for the current time point is computed except for the (unknown) targets, i.e., features and forecasts. A determination is made as to whether a new change point occurs before the current time point. If not, then the current reconciliation matrix is applied. If so, a new reconciliation matrix is fit and made to be the current reconciliation matrix, which is then applied to reconcile the forecasts (step 630). The output of this operation is reconciled forecasts for the current time point.

The current reconciliation model (output from step 620) is then updated with the new data as needed or specified, e.g., if enough steps have occurred, the dynamic reconciliation model is refit or updated, or some components of the reconciliation models are updated/fit as needed with the new data point (step 640). The output of this operation is a current reconciliation matrix, change point predictor, and optionally a set of past reconciliation matrices. If there are more runtime data points to process, the operation returns to step 630; otherwise the operation terminates.

FIG. 7 is a flowchart outlining an example operation for dynamically adapting a reconciliation model using a cluster based approach in accordance with one illustrative embodiment. As shown in FIG. 7, the operation starts by computing data points consisting of features, such as current and past time series observations, statistics in time windows, seasonality indicators, etc., targets (true time series values for prediction horizon), and forecasts for each time point in input historic dataset (step 710). The output is a dataset of tuples (x, y, f) such as a tuples of (features, targets, and forecasts) for each time point.

Data points are clustered according to an optimization problem that may include reconciliation or temporal regularization terms in an objective function. Optionally a cluster mapping/prediction function is fit to predict cluster membership given a data point (if the cluster is not given directly by the clustering method). A reconciliation matrix/model is fit per cluster via an optimization problem and loss function (step 720). The output of this operation is a mapping of clusters to reconciliation matrices P and a cluster membership predictor.

Then, for each production runtime point that occurs, the data point for the current time point is computed except for the (unknown) targets, i.e., features and forecasts. The cluster membership is predicted with the cluster membership predictor. If the membership is for existing cluster(s), a lookup of the reconciliation matrix/matrices for the cluster(s) the data point is a member of is performed. If the membership is not for an existing cluster, then a new cluster is generated and a new reconciliation matrix for this cluster is generated. The forecasts are reconciled with the final/selected reconciliation matrix (step 730). The output of this operation is reconciled forecasts for the current time point.

The current reconciliation model (output from step 720) is then updated with the new data as needed or specified, e.g., if enough steps have occurred, the dynamic reconciliation model is refit or updated, or some components of the reconciliation models are updated/fit as needed with the new data point (step 740). The output of this operation is a map of clusters to reconciliation matrices P and a cluster membership predictor. If there are more runtime data points to process, the operation returns to step 730; otherwise the operation terminates.

FIG. 8 is a flowchart outlining an example operation for dynamically adapting a reconciliation model using a stochastic process based approach in accordance with one illustrative embodiment. As shown in FIG. 8, the operation starts by computing data points consisting of features, such as current and past time series observations, statistics in time windows, seasonality indicators, etc., targets (true time series values for prediction horizon), and forecasts for each time point in input historic dataset (step 810). The output is a dataset of tuples (x, y, f) such as a tuples of (features, targets, and forecasts) for each time point.

A dynamic reconciliation model is fit to the historic dataset, i.e., the reconciliation matrix (or state) per time point along with a transition function mapping a matrix or state at one time point to the next, and possibly an output function to map the state to the final reconciliation matrix. This dynamic model is fit according to solving an optimization problem with a specified loss function minimizing reconciled forecast error across the historic data using the model (step 820). The output of this operation is a dynamic reconciliation model that consists of states for some number of historic time points as well as state transition function and possibly an output function.

Then, for each production runtime point that occurs, the data point for the current time point is computed except for the (unknown) targets, i.e., features and forecasts. A next state form the history of states and the state update function (that is part of the dynamic reconciliation model of the previous step) and the output which is part of the reconciliation matrix to use for the current forecast are obtained. The reconciliation matrix for the current forecast is applied (step 830). The output of this operation is reconciled forecasts for the current time point.

The current reconciliation model (output from step 820) is then updated with the new data, e.g., fit the reconciliation matrix or state for the current observed time point and optionally update the transition function. As needed or specified, e.g., if enough steps have occurred, the dynamic reconciliation model is refit or updated, including the historic states/matrices and the transition function (step 840). The output of this operation is a dynamic reconciliation model. If there are more runtime data points to process, the operation returns to step 830; otherwise the operation terminates.

FIG. 9 is a flowchart outlining an example operation for dynamically adapting a reconciliation model using a deep learning based approach in accordance with one illustrative embodiment. As shown in FIG. 9, the operation starts by computing data points consisting of features, such as current and past time series observations, statistics in time windows, seasonality indicators, etc., targets (true time series values for prediction horizon), and forecasts for each time point in input historic dataset (step 910). The output is a dataset of tuples (x, y, f) such as a tuples of (features, targets, and forecasts) for each time point.

A dynamic reconciliation model is fit to this historic dataset, i.e., the neural network model that consists of a state transition function neural network to map one state to the next state given current inputs and state, and an output function or network that maps the updated state to a reconciliation matrix or function. This dynamic model is fit according to solving an optimization problem with a specified loss function minimizing reconciled forecast error across the historic data using the model, e.g., with stochastic gradient descent (step 920). The output of this operation is a dynamic reconciliation model that consists of a neural network model that is applied to some history window of data points relative to the current point to get an output reconciliation mapping.

Then, for each production runtime point that occurs, the data point for the current time point is computed except for the (unknown) targets, i.e., features and forecasts. The neural network model is applied with a history window of data points up to and including the current data point, to evolve an initial state vector and then output a reconciliation function or matrix for the final state. The reconciliation function or matrix for the current forecast is applied (step 930). The output of this operation is reconciled forecasts for the current time point.

If enough steps have occurred, the dynamic model is refit, i.e., the whole neural network including all of its subnetworks that are a part of it (transition and output networks) are refit (step 940). The output of this operation is an updated dynamic reconciliation model. If there are more runtime data points to process, the operation returns to step 630; otherwise the operation terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides automated reconciliation computer tool/model performance predictions, ranking, and selection taking into consideration the features of a hierarchical dataset, features of the reconciliation computer tool/model, and features of the forecast computer model. The improved computing tool implements mechanism and functionality, such as the reconciliation computing tool/model recommendation engine 400 in FIG. 4A, which cannot be practically performed by human beings either outside of, or with the assistance of, a technical environment, such as a mental process or the like.

The improved computing tool provides a practical application of the methodology at least in that the improved computing tool is able to provide intelligent artificial intelligence based performance prediction of reconciliation computer tools/models and ultimately ranking and selection of a reconciliation computer tool/model from a large set of candidates while avoiding accuracy issues of static selection of a reconciliation computer tool/model and avoiding brute force methods of executing a plurality of reconciliation computer tools/models on the hierarchical data and determining after the fact which provides a highest accuracy result.

Figure 10:
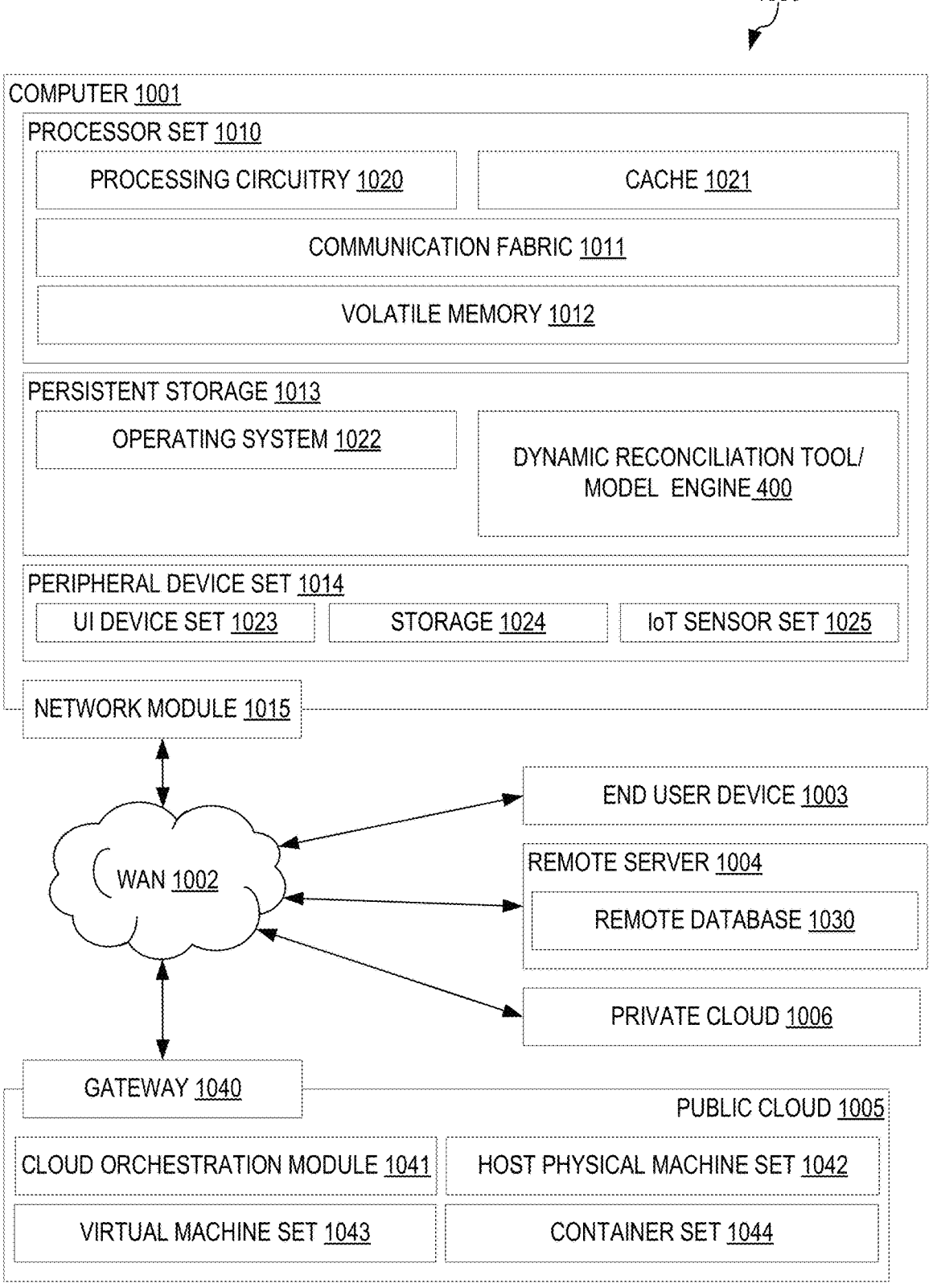
FIG. 10 is an example diagram of a distributed data processing system environment in which aspects of the illustrative embodiments may be implemented and at least some of the computer code involved in performing the inventive methods may be executed.

FIG. 10 is an example diagram of a distributed data processing system environment in which aspects of the illustrative embodiments may be implemented and at least some of the computer code involved in performing the inventive methods may be executed. That is, computing environment 1000 contains an example of an environment for the execution of at least some of the computer code involved in performing the inventive methods, such as the dynamic reconciliation tool/model engine 400 in FIG. 4A, for example. In addition to block 400, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 400, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 200 in persistent storage 1013.

Communication fabric 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 200 typically includes at least some of the computer code involved in performing the inventive methods.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001.

Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

As shown in FIG. 10, one or more of the computing devices, e.g., computer 1001 or remote server 1004, may be specifically configured to implement a reconciliation computing tool/model recommendation engine 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 1001 or remote server 1004, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates accurate reconciliation of forecast data across the levels of a hierarchical dataset without incurring the resource costs of a brute force methodology or the inaccuracies of a static selection of a reconciliation computer tool/model.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

executing a machine learning training operation on a dynamic reconciliation computer model engine to train the dynamic reconciliation computer model engine, based on historical data and corresponding forecast data, to learn an association of reconciliation computer models with structural changes in a hierarchical dataset;

generating runtime forecast data based on a runtime hierarchical dataset;

executing the trained dynamic reconciliation computer model engine on the runtime forecast data;

determining, during runtime and based on one or more parameters associated with different groups across a hierarchy of the runtime forecast data, that a change in the reconciliation computer models is needed to adapt to dynamic conditions represented in the runtime forecast data based on structural changes in the runtime forecast data, wherein the dynamic reconciliation computer model engine is configured to automatically and dynamically apply different ones of the reconciliation computer models to the different groups;

automatically and dynamically adapting, by the trained dynamic reconciliation computer model engine and based on determining that the change is needed, the reconciliation computer models to the dynamic conditions based on a learned reconciliation model mapping, wherein adapting the reconciliation computer models includes selecting reconciliation models or modifying parameters of a dynamic reconciliation matrix;

generating reconciled runtime forecast data based on results of executing the trained dynamic reconciliation computer model engine with the adapted reconciliation computer models on the runtime forecast data; and outputting the reconciled runtime forecast data as part of a decision support user interface.

2. The computer-implemented method of claim 1, wherein the reconciliation computer models reconcile forecast data to be coherent across a hierarchy of reconciled forecast data for an associated portion of the hierarchical dataset between structural changes in the hierarchical dataset.

3. The computer-implemented method of claim 2, wherein the reconciliation computer models comprise a plurality of different reconciliation matrices, wherein different associated portions of the hierarchical dataset are associated with different reconciliation matrices in the plurality of different reconciliation matrices.

4. The computer-implemented method of claim 2, wherein the reconciliation computer models comprise at least one reconciliation function that is trained through the machine learning training operation to fit the historical data and corresponding forecast data.

5. The computer-implemented method of claim 2, wherein the reconciliation computer models comprise at least one neural network computer model that is trained through the machine learning training operation to generate reconciled forecast data based on features extracted from the historical data and corresponding forecast data.

6. The computer-implemented method of claim 1, wherein the runtime hierarchical dataset is received dynamically over time, and wherein executing the trained dynamic reconciliation computer model engine on the runtime forecast data comprises:

determining, based on results of executing the trained dynamic reconciliation computer model engine on the dynamically received runtime hierarchical dataset, whether a change in reconciliation computer model is to be performed from a previously applied reconciliation computer model;

in response to determining that a change in reconciliation computer model is to be performed, mapping features of the dynamically received runtime hierarchical dataset and corresponding runtime forecast data to a corresponding reconciliation computer model; and executing the corresponding reconciliation computer model on the corresponding runtime forecast data.

7. The computer-implemented method of claim 1, wherein the dynamic reconciliation computer model engine comprises a change point detection based computer model that is trained to identify change points in the hierarchical dataset and associated with each change point a corresponding reconciliation computer model that performs reconciliation of forecast data based on a corresponding reconciliation matrix.

8. The computer-implemented method of claim 1, wherein the dynamic reconciliation computer model engine comprises a cluster based computer model that is trained to cluster data points in the hierarchical dataset into clusters and associated with each cluster a corresponding reconciliation computer model that performs reconciliation of forecast data based on a corresponding reconciliation matrix.

9. The computer-implemented method of claim 1, wherein the dynamic reconciliation computer model engine comprises at least one of a stochastic based computer model that applies a learned reconciliation function to the hierarchical dataset, or a deep learning computer model that is trained through the machine learning training operation to predict reconciled forecast data based on features extracted from forecast data associated with the hierarchical dataset.

10. The computer-implemented method of claim 1, wherein the hierarchical dataset is a time series dataset.

11. A computer program product comprising a computer readable storage medium having a computer readable program stored therein, wherein the computer readable program, when executed on a computing device, causes the computing device to:

execute a machine learning training operation on a dynamic reconciliation computer model engine to train the dynamic reconciliation computer model engine, based on historical data and corresponding forecast data, to learn an association of reconciliation computer models with structural changes in a hierarchical dataset;

generate runtime forecast data based on a runtime hierarchical dataset;

execute the trained dynamic reconciliation computer model engine on the runtime forecast data;

determine, during runtime and based on one or more parameters associated with different groups across a hierarchy of the runtime forecast data, that a change in the reconciliation computer models is needed to adapt to dynamic conditions represented in the runtime forecast data based on structural changes in the runtime forecast data, wherein the dynamic reconciliation computer model engine is configured to automatically and dynamically apply different ones of the reconciliation computer models to the different groups;

automatically and dynamically adapt, by the trained dynamic reconciliation computer model engine and based on determining that the change is needed, the reconciliation computer models to the dynamic conditions based on a learned reconciliation model mapping, wherein adapting the reconciliation computer models includes selecting reconciliation models or modifying parameters of a dynamic reconciliation matrix;

generate reconciled runtime forecast data based on results of executing the trained dynamic reconciliation computer model engine with the adapted reconciliation computer models on the runtime forecast data; and output the reconciled runtime forecast data as part of a decision support user interface.

12. The computer program product of claim 11, wherein the reconciliation computer models reconcile forecast data to be coherent across a hierarchy of reconciled forecast data for an associated portion of the hierarchical dataset between structural changes in the hierarchical dataset.

13. The computer program product of claim 12, wherein the reconciliation computer models comprise a plurality of different reconciliation matrices, wherein different associated portions of the hierarchical dataset are associated with different reconciliation matrices in the plurality of different reconciliation matrices.

14. The computer program product of claim 12, wherein the reconciliation computer models comprise at least one reconciliation function that is trained through the machine learning training operation to fit the historical data and corresponding forecast data.

15. The computer program product of claim 12, wherein the reconciliation computer models comprise at least one neural network computer model that is trained through the machine learning training operation to generate reconciled forecast data based on features extracted from the historical data and corresponding forecast data.

16. The computer program product of claim 11, wherein the runtime hierarchical dataset is received dynamically over time, and wherein executing the trained dynamic reconciliation computer model engine on the runtime forecast data comprises:

determining, based on results of executing the trained dynamic reconciliation computer model engine on the dynamically received runtime hierarchical dataset, whether a change in reconciliation computer model is to be performed from a previously applied reconciliation computer model;

in response to determining that a change in reconciliation computer model is to be performed, mapping features of the dynamically received runtime hierarchical dataset and corresponding runtime forecast data to a corresponding reconciliation computer model; and executing the corresponding reconciliation computer model on the corresponding runtime forecast data.

17. The computer program product of claim 11, wherein the dynamic reconciliation computer model engine comprises a change point detection based computer model that is trained to identify change points in the hierarchical dataset and associated with each change point a corresponding reconciliation computer model that performs reconciliation of forecast data based on a corresponding reconciliation matrix.

18. The computer program product of claim 11, wherein the dynamic reconciliation computer model engine comprises a cluster based computer model that is trained to cluster data points in the hierarchical dataset into clusters and associated with each cluster a corresponding reconciliation computer model that performs reconciliation of forecast data based on a corresponding reconciliation matrix.

19. The computer program product of claim 11, wherein the dynamic reconciliation computer model engine comprises at least one of a stochastic based computer model that applies a learned reconciliation function to the hierarchical dataset, or a deep learning computer model that is trained through the machine learning training operation to predict reconciled forecast data based on features extracted from forecast data associated with the hierarchical dataset.

20. An apparatus comprising:

at least one processor; and at least one memory coupled to the at least one processor, wherein the at least one memory comprises instructions which, when executed by the at least one processor, cause the at least one processor to:

execute a machine learning training operation on a dynamic reconciliation computer model engine to train the dynamic reconciliation computer model engine, based on historical data and corresponding forecast data, to learn an association of reconciliation computer models with structural changes in a hierarchical dataset;

generate runtime forecast data based on a runtime hierarchical dataset;

execute the trained dynamic reconciliation computer model engine on the runtime forecast data;

determine, during runtime and based on one or more parameters associated with different groups across a hierarchy of the runtime forecast data, that a change in the reconciliation computer models is needed to adapt to dynamic conditions represented in the runtime forecast data based on structural changes in the runtime forecast data, wherein the dynamic reconciliation computer model engine is configured to automatically and dynamically apply different ones of the reconciliation computer models to the different groups;

automatically and dynamically adapt, by the trained dynamic reconciliation computer model engine and based on determining that the change is needed, the reconciliation computer models to the dynamic conditions based on a learned reconciliation model mapping, wherein adapting the reconciliation computer models includes selecting reconciliation models or modifying parameters of a dynamic reconciliation matrix;

generate reconciled runtime forecast data based on results of executing the trained dynamic reconciliation computer model engine with the adapted reconciliation computer models on the runtime forecast data; and output the reconciled runtime forecast data as part of a decision support user interface.

* * * * *